US011281877B2

(12) United States Patent
Swartz et al.

(10) Patent No.: US 11,281,877 B2
(45) Date of Patent: Mar. 22, 2022

(54) METHODS AND SYSTEMS FOR GUIDED LOCK-TAG-TRY PROCESS

(71) Applicant: COLUMBIA INSURANCE COMPANY, Omaha, NE (US)

(72) Inventors: Erika Elizabeth Swartz, Chattanooga, TN (US); Joseph Charles Dean, Dalton, GA (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 259 days.

(21) Appl. No.: 16/295,866

(22) Filed: Mar. 7, 2019

(65) Prior Publication Data

US 2019/0392186 A1 Dec. 26, 2019

Related U.S. Application Data

(60) Provisional application No. 62/690,199, filed on Jun. 26, 2018.

(51) Int. Cl.
*G06K 7/14* (2006.01)
*G06F 16/901* (2019.01)
*G05B 19/418* (2006.01)

(52) U.S. Cl.
CPC ..... *G06K 7/1417* (2013.01); *G05B 19/41835* (2013.01); *G06F 16/901* (2019.01)

(58) Field of Classification Search
CPC ..... G06K 7/1417; G06F 16/901; G06F 6/901; G05B 19/41835; G05B 2219/34315
See application file for complete search history.

(56) References Cited

U.S. PATENT DOCUMENTS

| 7,530,113 | B2 | 5/2009 | Braun |
| 8,751,504 | B2 | 6/2014 | Michalscheck |
| 9,455,839 | B2 | 9/2016 | Conrad et al. |
| 9,501,046 | B2 * | 11/2016 | Kalous ..................... G05B 1/01 |
| 9,541,905 | B2 | 1/2017 | Nixon et al. |
| 9,600,949 | B2 | 3/2017 | Conrad et al. |
| 9,657,763 | B2 | 5/2017 | Johnson |

(Continued)

FOREIGN PATENT DOCUMENTS

| AU | 2013222215 A1 | 9/2014 |
| AU | 2015296491 A1 | 2/2017 |

(Continued)

OTHER PUBLICATIONS

Theresa Impink-Hernandez "Using Lockout/Tagout Technology to Manage Your Program" (2014) [retrieved on Mar. 7, 2019] URL:https://www.escservices.com/2014/01/15/using-lockout-tagout-technology-to-manage-your-program/.

(Continued)

*Primary Examiner* — Daniel I Walsh
(74) *Attorney, Agent, or Firm* — Ballard Spahr LLP

(57) ABSTRACT

Systems and methods for performing a Lock-Tag-Try (LTT) process. A computing device may scan an indicator and request a content item associated with the indicator. The computing device may receive the one or more content items associated with the indicator. The one or more content items are configured to guide a user through the LTT process. A server may be configured to receive the request and transmit the content item to the user device. The server may be further configured to store information related to the LTT process.

20 Claims, 14 Drawing Sheets

(56) References Cited

U.S. PATENT DOCUMENTS

| | | | |
|---|---|---|---|
| 9,678,484 B2 | 6/2017 | Nixon et al. | |
| 9,778,626 B2 | 10/2017 | Nixon et al. | |
| 9,799,236 B2 | 10/2017 | Moore | |
| 9,916,466 B2* | 3/2018 | Daino | G06F 21/6218 |
| 9,965,910 B2* | 5/2018 | Kalous | G05B 1/01 |
| 10,254,749 B2* | 4/2019 | Main-Reade | G07C 9/00103 |
| 2006/0151306 A1* | 7/2006 | Lau | H01H 9/282 |
| | | | 200/43.14 |
| 2007/0092128 A1* | 4/2007 | Noy | H05K 3/225 |
| | | | 382/145 |
| 2010/0127821 A1 | 5/2010 | Jones et al. | |
| 2012/0226764 A1* | 9/2012 | Philip | H04L 67/125 |
| | | | 709/208 |
| 2013/0214903 A1* | 8/2013 | Kalous | G07C 9/00309 |
| | | | 340/5.61 |
| 2014/0188502 A1* | 7/2014 | Defrank | G16H 40/67 |
| | | | 705/2 |
| 2014/0244527 A1* | 8/2014 | Michalscheck | G06Q 30/018 |
| | | | 705/317 |
| 2014/0273847 A1 | 9/2014 | Nixon et al. | |
| 2014/0274123 A1 | 9/2014 | Nixon et al. | |
| 2014/0277593 A1 | 9/2014 | Nixon et al. | |
| 2014/0277594 A1 | 9/2014 | Nixon et al. | |
| 2014/0277595 A1 | 9/2014 | Nixon et al. | |
| 2014/0277596 A1 | 9/2014 | Nixon et al. | |
| 2014/0277605 A1 | 9/2014 | Nixon et al. | |
| 2014/0277607 A1 | 9/2014 | Nixon et al. | |
| 2014/0277615 A1* | 9/2014 | Nixon | G05B 11/01 |
| | | | 700/83 |
| 2014/0277616 A1 | 9/2014 | Nixon et al. | |
| 2014/0277617 A1 | 9/2014 | Nixon et al. | |
| 2014/0277618 A1 | 9/2014 | Nixon et al. | |
| 2014/0282015 A1* | 9/2014 | Nixon | G05B 11/01 |
| | | | 715/733 |
| 2014/0282257 A1* | 9/2014 | Nixon | G05B 11/01 |
| | | | 715/835 |
| 2014/0283008 A1* | 9/2014 | Daino | G06F 21/6218 |
| | | | 726/17 |
| 2014/0289192 A1 | 9/2014 | Michalscheck | |
| 2014/0307076 A1* | 10/2014 | Deutsch | F16P 3/147 |
| | | | 348/77 |
| 2016/0035163 A1* | 2/2016 | Conrad | H04W 12/0433 |
| | | | 340/5.61 |
| 2016/0132046 A1* | 5/2016 | Beoughter | G05B 19/4184 |
| | | | 700/17 |
| 2016/0140429 A1* | 5/2016 | Glosser | G06K 19/06075 |
| | | | 702/185 |
| 2016/0282843 A1* | 9/2016 | Michalscheck | G05B 19/042 |
| 2016/0282858 A1* | 9/2016 | Michalscheck | G07C 3/00 |
| 2016/0284073 A1* | 9/2016 | Michalscheck | G06T 7/001 |
| 2016/0285274 A1* | 9/2016 | Jauquet | F16K 37/0025 |
| 2017/0140596 A1* | 5/2017 | Retzlaff | G07C 1/32 |
| 2018/0108196 A1* | 4/2018 | Abner | G07C 9/00182 |
| 2018/0167549 A1* | 6/2018 | Lim | H04N 5/2252 |
| 2018/0321661 A1* | 11/2018 | Main-Reade | G05B 19/406 |
| 2019/0065795 A1* | 2/2019 | Valencia | H01H 9/286 |
| 2019/0392186 A1* | 12/2019 | Swartz | G06K 7/1417 |
| 2020/0394578 A1* | 12/2020 | Taggart | G06F 21/31 |
| 2021/0064646 A1* | 3/2021 | Nguyen | G06F 16/433 |
| 2021/0065020 A1* | 3/2021 | Schmirler | G06K 9/6256 |
| 2021/0089004 A1* | 3/2021 | Lasko | H01H 71/04 |

FOREIGN PATENT DOCUMENTS

| | | |
|---|---|---|
| AU | 2017100066 A4 | 2/2017 |
| AU | 2015296492 A1 | 3/2017 |
| CA | 2864933 A1 | 8/2013 |
| CA | 2945894 A1 | 8/2013 |
| CA | 2955795 A1 | 2/2016 |
| CA | 2955797 A1 | 2/2016 |
| CA | 2921447 A1 | 8/2016 |
| EP | 2817764 A1 | 12/2014 |
| EP | 3076257 A1 | 10/2016 |
| EP | 3163517 A1 | 5/2017 |
| EP | 3175433 A1 | 6/2017 |
| EP | 3175636 A1 | 6/2017 |
| EP | 3188082 A1 | 7/2017 |
| GB | 2512999 A | 10/2014 |
| GB | 2513000 A | 10/2014 |
| GB | 2513455 A | 10/2014 |
| GB | 2513456 A | 10/2014 |
| GB | 2513457 A | 10/2014 |
| GB | 2513708 A | 11/2014 |
| GB | 2513709 A | 11/2014 |
| GB | 2513956 A | 11/2014 |
| GB | 2513957 A | 11/2014 |
| GB | 2513958 A | 11/2014 |
| GB | 2514644 A | 12/2014 |
| WO | WO-2013126753 A1 | 8/2013 |
| WO | WO-2016019064 A1 | 2/2016 |
| WO | WO-2016019065 A1 | 2/2016 |

OTHER PUBLICATIONS

ESC "Creating Digital Only Lockout/Tagout Procedures" [retrieved on Mar. 7, 2019] URL: https://www.escservices.com/lockout-tagout-procedures/creating-digital-lockout-tagout-procedures/.

Ashley Reyes, "ScanESC—Your Entire Lockout Tagout Database in One Convenient Place" (2014)[retrieved on Mar. 7, 2019] URL: https://www.escservices.com/2014/05/15/scanesc-your-entire-lockout-tagout-database-one-convenient-tablet/.

International Search Report and Written Opinion were dated Aug. 12, 2019 by the International Searching Authority for International Application No. PCT/US2019/039219, filed on Jun. 26, 2019 (Applicant-Shaw Industries Group Inc.) (9 Pages).

* cited by examiner

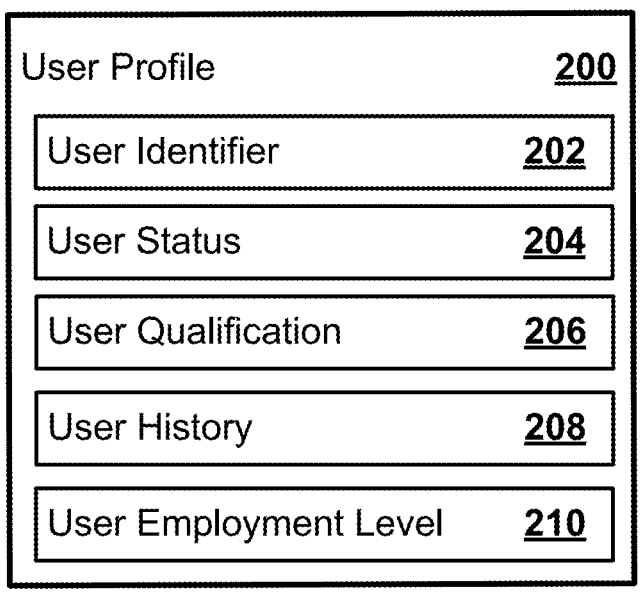
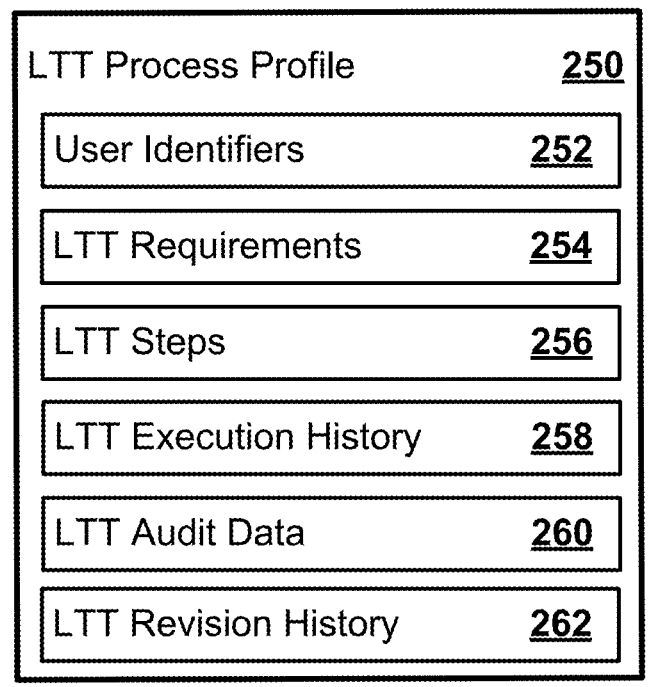
FIG. 2

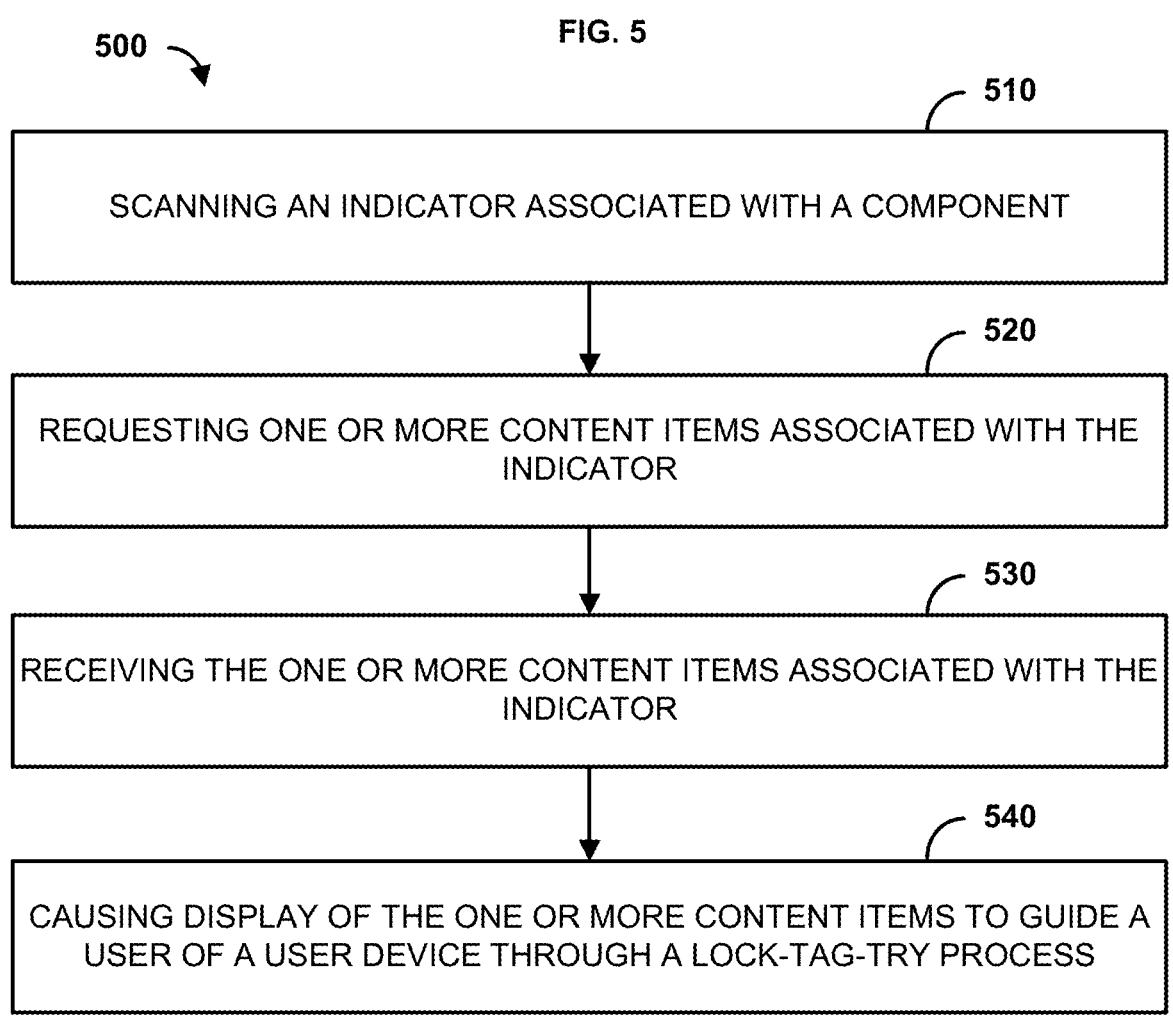

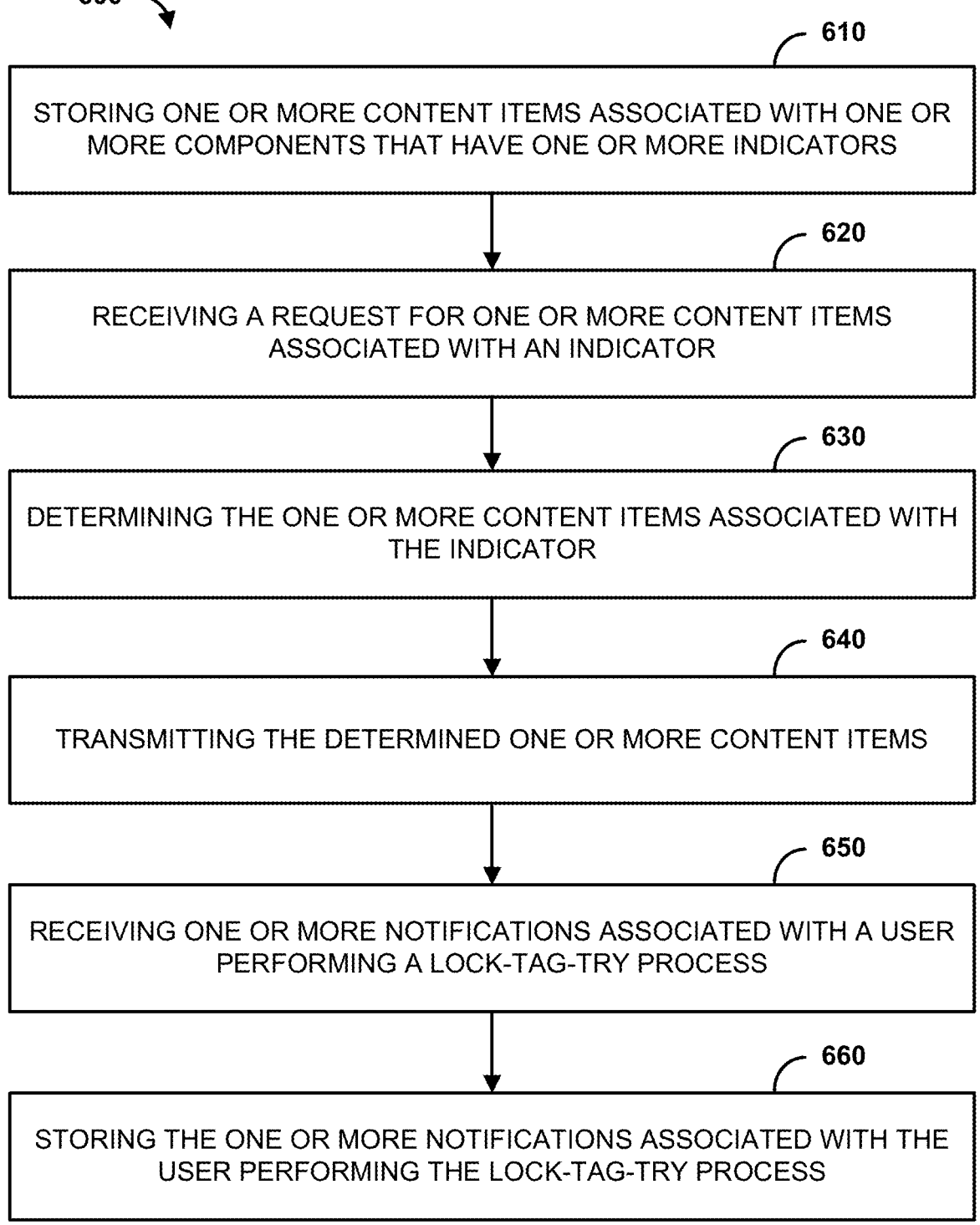

METHODS AND SYSTEMS FOR GUIDED LOCK-TAG-TRY PROCESS

CROSS REFERENCE TO RELATED PATENT APPLICATION

This application claims priority to U.S. Provisional Application No. 62/690,199, filed on Jun. 26, 2018, which is herein incorporated by reference in its entirety.

BACKGROUND

When performing maintenance or repair on industrial machinery, it is imperative that the machinery be properly de-energized so that there are no hazards to a technician performing the maintenance. Otherwise, the technician may be severely injured. The Occupational Safety and Health Administration (OSHA) requires employers to create and implement a program for the control of hazardous energy sources (Lockout/Tagout) pursuant to "Occupational Safety and Health Standards" found in 29 C.F.R. § 1910. The standards contain definitive criteria for establishing an effective program for locking out or tagging out energy isolating devices and requires training for authorized and affected employees. The standards require the employer to implement specified procedures, such as a Lockout/Tagout process, and to utilize effective control measures based on hazards that are encountered in the workplace. While the Lockout/Tagout process is typically described in detail to ensure each step is properly followed, the process is still implemented by humans, which can lead to error or non-compliance that puts employees at risk. Further, there is no practical method for tracking and recording a Lockout/Tagout process occurring in a manufacturing facility to ensure employee safety. These and other shortcomings are addressed by the methods and systems described herein.

SUMMARY

It is to be understood that both the following general description and the following detailed description are exemplary and explanatory only and are not restrictive. Provided are systems and methods for performing a Lock-Tag-Try (LTT) process.

In one embodiment, a system comprises a plurality of indicators affixed to one or more components, a user device, and a server. The user device may be configured to scan an indicator of the plurality of indicators. In response to scanning the indicator, the user device may be configured to request one or more content items associated with the indicator. The user device may also be configured to receive the one or more content items associated with the indicator. The user device may further be configured to cause the one or more content items to be displayed. The one or more content items can be configured to guide a user of the user device through performing a lock-tag-try process associated with the one or more components. The server may be configured to receive the request for the one or more content items associated with the indicator from the user device. The server may also be configured to determine the one or more content items associated with the one or more indicators. The server may further be configured to transmit the one or more content items to the user device. The server may also be configured to receive one or more notifications associated with the user performing the lock-tag-try process from the user device.

In another embodiment, a method may comprise scanning, by a user device, an indicator of a plurality of indicators. The plurality of indicators may be affixed to one or more components. The method may also comprise, in response to scanning the first indicator, requesting, by the user device from a computing device, one or more content items associated with the first indicator. The method may further comprise receiving, from the computing device, the one or more content items associated with the first indicator. Additionally, the method may comprise causing, by the user device, display of the one or more content items. The one or more content items may be configured to guide a user of the user device through performing a lock-tag-try process associated with the one or more components.

In an additional embodiment, a method may comprise storing, by a computing device, one or more content items associated with one or more components. Each of the components may have one or more of a plurality of indicators affixed to the components. The method may also comprise receiving, by the computing device from a user device, a request for one or more content items associated with an indicator. The request may be transmitted in response to the user device scanning the first indicator. The method may additionally comprise retrieving, by the computing device, one or more content items associated with the indicator. The method may further comprise transmitting, by the computing device to the user device, the retrieved one or more content items. Additionally, the method may comprise receiving, by the computing device from the user device, one or more notifications associated with the user performing a lock-tag-try process.

Additional advantages will be set forth in part in the description which follows or can be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems:

FIG. 2 is a diagram illustrating exemplary data structures;
FIG. 5 is a flowchart of an example method;
FIG. 6 is a flowchart of an example method.

DETAILED DESCRIPTION

Figure 1:
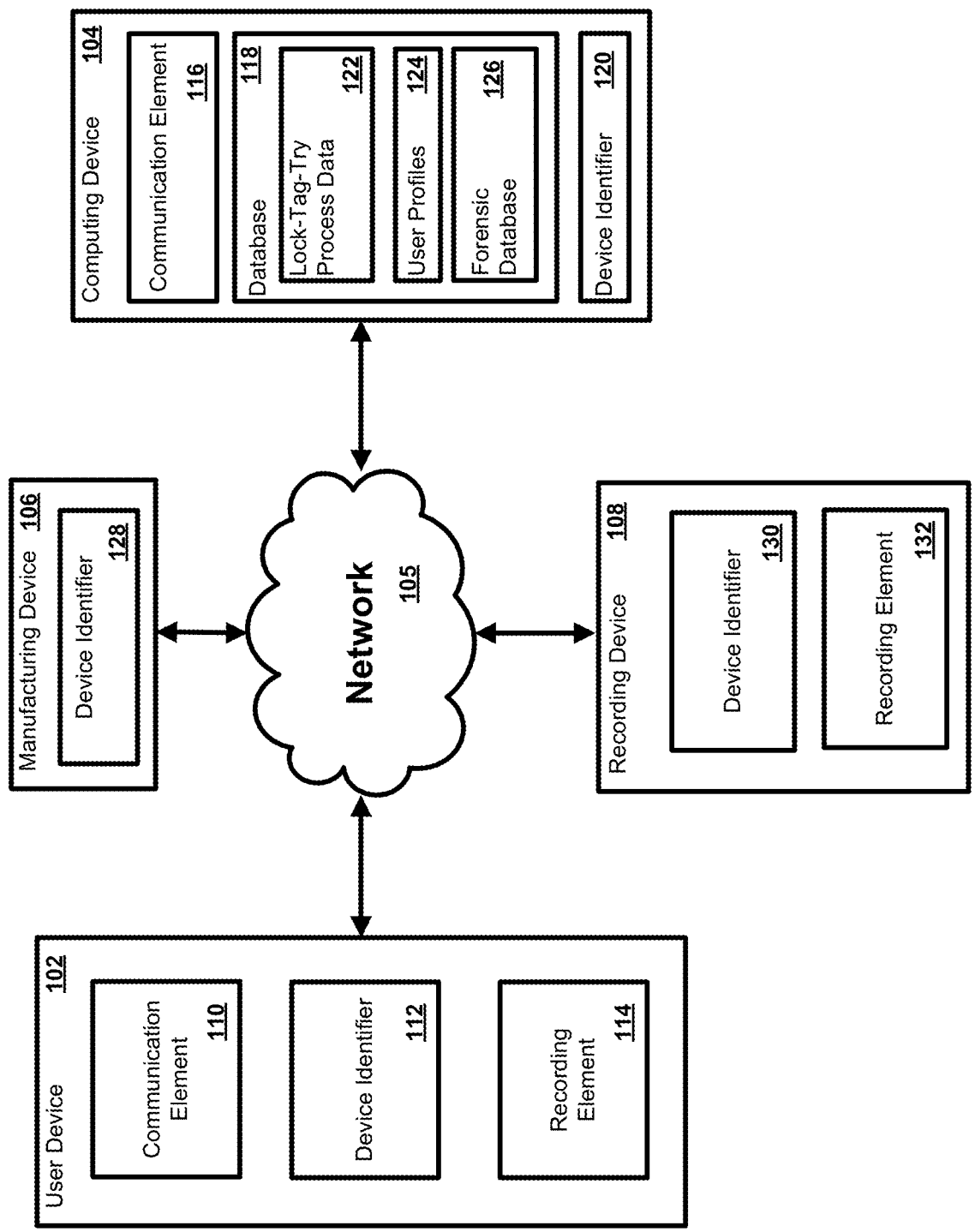
FIG. 1 is a diagram illustrating an exemplary system.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes examples where said event or circumstance occurs and examples where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal example. "Such as" is not used in a restrictive sense, but for explanatory purposes.

Described herein are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all examples of this application including, but not limited to, steps in described methods. Thus, if there are a variety of additional steps that may be performed it is understood that each of these additional steps may be performed with any specific example or combination of examples of the described methods.

The present methods and systems may be understood more readily by reference to the following detailed description of preferred examples and the examples included therein and to the Figures and their previous and following description.

As will be appreciated by one skilled in the art, the methods and systems may take the form of an entirely hardware example, an entirely software example, or an example combining software and hardware example. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Note that in various examples this detailed disclosure may refer to a given entity performing some action. It should be understood that this language may in some cases mean that a system (e.g., a computer) owned and/or controlled by the given entity is actually performing the action.

FIG. 1 shows an example of a system 100. Those skilled in the art will appreciate that the methods described herein may be used in systems that employ both digital and analog equipment. One skilled in the art will appreciate that provided herein is a functional description and that the respective functions may be performed by software, hardware, or a combination of software and hardware.

As shown, the system 100 comprises a user device 102, a computing device 104, a manufacturing device 106, and a recording device 108. The computing device 104 can be disposed locally or remotely relative to the user device 102. The user device 102, the computing device 104, the manufacturing device 106, and the recording device can be in communication via the network 105. The network 105 can be a private and/or a public network such as the Internet or a local area network. Further, the network 105 can be a wired network, a wireless network, or a combination of the two.

In an aspect, the user device 102 can be an electronic device such as a computer, a smartphone, a laptop, a tablet, a display device, or other device capable of communicating with the computing device 104. As an example, the user device 102 can comprise a communication element 110 for providing an interface to a user to interact with the user device 102 and/or the computing device 104. The communication element 110 can be any interface for presenting and/or receiving information to/from the user, such as user feedback. An example interface may be a communication interface such as a web browser (e.g., Internet Explorer, Mozilla Firefox, Google Chrome, Safari, or the like). As another example, the communication element 110 can be an application on the user device 102 that a user interacts with. For example, the communication element 110 can be an application associated with a Lock-Tag-Try (LTT) process.

The user can interact with the communication element 110 to initiate the LTT process as will be described in greater detail with regards to FIG. 5. The communication element 110 can also request or query various files from a local source and/or a remote source, such as the computing device 104. As an example, the communication element 110 can request information related to the LTT process, such as a process manual, from the computing device 104. As a further example, the communication element 110 can transmit data to a local or remote device such as the computing device 104. For example, the communication element 110 can transmit notifications to the computing device 104 that are associated with the LTT process. The notifications can indicate that a user has completed one or more steps in the LTT process.

The user device 102 can be associated with a user identifier or device identifier 112. As an example, the device identifier 112 can be any identifier, token, character, string, or the like, for differentiating one user or user device (e.g., user device 102) from another user or user device. The device identifier 112 can identify a user or user device as belonging to a particular class of users or user devices. As a further example, the device identifier 112 can comprise information relating to the user device 102 such as a manufacturer, a model or type of device, a service provider associated with the user device 102, a state of the user device 102, a locator, and/or a label or classifier. Other information can be represented by the device identifier 112. For example, the device identifier 112 can be an internet protocol address, a network address, a media access control (MAC) address, an Internet address, or the like. As an example, the device identifier 112 can be relied upon to establish a communication session between the user device 102 and the computing device 104 or other devices and/or networks. As a further example, the device identifier 112 can be used as an identifier or locator of the user device 102.

The user device 102 can also comprise a recording element 114. The recording element 114 can be any device capable of recording data such a still camera, a video camera, a microphone, and so forth. The recording element 114 can record completed steps of the LTT process in order to document the completed steps. The user device 102 can store the records of the completed steps in a memory (not shown). The user device 102 can also provide the recordings of the recording element 114 to the computing device 104 via the network 105. The computing device 104 can then store the evidence of the completed steps.

The computing device 104 can have a communication element 116, a database 118, and a device identifier 120. For example, the computing device 104 can be a server for communicating with the user device 102, the manufacturing device 106, and/or the recording device 108. The computing device 104 can communicate with the user device 102 for providing data and/or services. As an example, the computing device 104 can provide a process manual for completing an LTT process to the user device 102. The computing device 104 can have a communication element 116. The communication element 116 can be any interface for presenting and/or receiving information to/from a user, such as user feedback. An example interface may be a communication interface such as a web browser (e.g., Internet Explorer, Mozilla Firefox, Google Chrome, Safari, or the like). For example, the communication element 116 can allow a user, such as a manager or administrator, to determine the proper process for completing an LTT process. As an example, the manager or administrator can provide a manual or a process that maps out the specific steps required to complete the LTT process via the communication element. As another example, the communication element 116 can allows the user to communicate with the manufacturing device 106 and the recording device 108 to transmit data and/or notifications associated with the manufacturing device 106 and the recording device 108.

The computing device 104 can have a database 118. Any information can be stored in and retrieved from the database 118. For example, the database 118 can store data associated with the user device 102, the manufacturing devices 106, and/or the recording device 108. As an example, the database 118 can include information on all the devices within a manufacturing facility such as location, make, model, and status of the devices. The database 118 can also include information associated with personnel within the manufacturing facility (e.g., location, health status, whether performing an LTT process, etc.) in order to monitor the safety of the personnel. For example, the database 118 can include one or more of an evidence database, an event database, a content database, a user database, and/or a forensic database (e.g., the forensic database 126). The database 118 can be disposed remotely from the computing device 104 and accessed via a direct or an indirect connection. The database 118 can be integrated with the computing system 104 or a different device or system.

The database 118 can store content items for access by one or more users. Specifically, the database 118 can store Lock-Tag-Try (LTT) process data 122. The LTT process data 122 can include any information and/or content items related to an LTT process. For example, the LTT process data 122 can include digital manuals for completing an LTT process for a plurality of devices (e.g., the manufacturing device 106). As an example, an LTT process manual can include detailed information on the steps necessary to render a device (e.g., the manufacturing device 106) safe to perform maintenance on. That is, the LTT process manual can provide detailed steps to disable, isolate, de-energize, and/or render safe specific components of the device in order to allow a technician to safely repair or access one or more components of the device.

The LTT process data 122 can also include information relating to the execution of the LTT process. For example, the user device 102 can transmit data associated with the LTT process (e.g., recordings, notifications indicating a step was completed, etc.) to the computing device 104, which stores the information from the user device 102 within the database 118. As an example, the user device 102 can transmit to the computing device 104 a picture that captures evidence that a step in the LTT process was successfully completed. The computing device 104 can store the picture within the LTT process data 122. The LTT process data 122 can also store data related to completed LTT processes to ensure the LTT processes are being properly executed. That is, the LTT process data 122 can include any information that may indicate whether the LTT process, or steps of the LTT process, are successfully or unsuccessfully completed. For example, the LTT process data 122 can include forensic data that would allow a manager or administrator to determine from the LTT process data 122 that LTT processes are being properly implemented by personnel executing the LTT processes. Further, the LTT process data 122 can include information associated with an event (e.g., an emergency, an injury, etc.) in order to determine the cause of the event so that the event may be prevented in the future. As an example, if a technician is injured while executing an LTT process, the LTT process data 122 can store information related to the injury to help determine what caused the injury so that future injuries to personnel may be prevented. The LTT process data 122 can also include LTT process profiles that are associated with a specific LTT process as further explained in FIG. 2.

The database 118 can also store one or more user profiles 124. The user profiles 124 may each be associated with a specific user. The user profiles 124 may comprise information and/or data associated with the user. For example, the user profiles 124 may contain information regarding the status of a user, a user's history of locking out devices, a user's training history, a user's qualifications to lockout a device, a user's employment level (e.g., trainee, employee level, manager, etc.), and so forth. The system 100 may utilize the user profiles 124 to determine whether a specific user has the qualifications and/or training necessary to lockout a device (e.g., the manufacturing device 106). The system 100 may also utilize the user profiles 124 to keep track of a history of the devices that a user has locked out. Further, the system 100 may utilize the user profiles 124 to notify users when the user's training is about to expire and/or has expired in order to allow the user to complete the training necessary to properly lockout a device.

The database 118 can have forensic database 126. In one example, the forensic database 126 comprises data that cannot be modified or changed by a user. For example, the forensic database 126 can keep track of all information associated with the LLT process, as well as any users associated with the system 100. Thus, the forensic database 126 can store and maintain any data associated with the system 100. The forensic database 126 can be encrypted to secure the data stored within the forensic database 126. The forensic database 126 can be secured from all users of the system 100. Stated differently, the forensic database 126 can be inaccessible by all users of the system 100 such that the integrity of the data stored within the forensic database 126 is maintained, and there is no risk of a user modifying the data stored within the forensic database 126. The database 118 may regularly update the data stored within the forensic database 126 to ensure that the forensic database 126 has the most up-to-date information associated with any LTT process attempted within the system 100. In this manner, the system 100 can keep track of all user actions and LTT processes that occur within the system 100.

The computing device 104 can be associated with a user identifier or device identifier 120. As an example, the device identifier 120 can be any identifier, token, character, string, or the like, for differentiating one user or computing device (e.g., computing device 104) from another user or computing device. The device identifier 120 can identify a user or user device as belonging to a particular class of users or user devices. As a further example, the device identifier 120 can comprise information relating to the computing device 104 such as a manufacturer, a model or type of device, a service provider associated with the computing device 104, a state of the computing device 104, a locator, and/or a label or classifier. Other information can be represented by the device identifier 120. For example, the device identifier 120 can be an internet protocol address, a network address, a media access control (MAC) address, an Internet address, or the like. As an example, the device identifier 120 can be relied upon to establish a communication session between the computing device 104 and the user device 102, the manufacturing device 106, the recording device 108, or other devices and/or networks. As a further example, the device identifier 120 can be used as an identifier or locator of the computing device 104.

The manufacturing device 106 can be any device capable of manufacturing a good. For example, the manufacturing device 106 can be related to the production of consumer goods, construction materials (e.g., flooring, carpets, etc.), and so forth. The manufacturing device 106 can include one or more components. The components can include the functionality to shut down, disable, and/or render safe the manufacturing device. Some non-limiting examples include a physical block to hold a hydraulic cylinder in position, a power disconnect to remove the power supply, a valve to shut off water or steam supply, etc. As another example, the components can include respective switches (e.g., electrical disconnects, valves, etc.) associated with the each of the components so that a person desiring to perform maintenance on the manufacturing device 106 can deenergize and/or render safe each of the components in order to safely preform maintenance on the manufacturing device 106. As an example, each component of the manufacturing device 106 can have a respective power switch that needs to be switched from the "ON" position to the "OFF" position in order to turn of the respective component. Once all the component switches are switched to the "OFF" position, maintenance on the manufacturing device 106 can be safely performed. The manufacturing device 106 may also have a main safety switch that may power off all components of the manufacturing device 106.

The manufacturing device 106 can be associated with a device identifier 128. As an example, the device identifier 128 can be any identifier, token, character, string, or the like, for differentiating the manufacturing device (e.g., manufacturing device 106) from another manufacturing device or other device. As an example, the device identifier 128 can be a visual codes such as a data matrix, a Quick Response (QR) code, barcode, or another visual code that is unique to the manufacturing device 106. Additionally, the device identifier 128 may be an electronic identifier. For example, a device (e.g., e.g., the user device 102, the recording device 108) can scan the visual code to determine the identity of the manufacturing device 106. The user device may in turn request information (e.g., a LTT process manual) associated with the manufacturing device 106 based on the scanned visual code. The device identifier 128 can identify the manufacturing device 106 as belonging to a particular class of device. As a further example, the device identifier 128 can comprise information relating to the manufacturing device 106 such as a manufacturer, a model or type of device, a service provider associated with the manufacturing device 106, a state of the manufacturing device 106, a locator, and/or a label or classifier. Other information can be represented by the device identifier 128. For example, the device identifier 128 can be an internet protocol address, a network address, a media access control (MAC) address, an Internet address, or the like. As an example, the device identifier 128 can be relied upon to establish a communication session between the manufacturing device 106 and the user device 102, the computing device 104, the recording device 108, or other devices and/or networks. As a further example, the device identifier 128 can be used as an identifier or locator of the manufacturing device 106.

The device identifier 128 can also identify components of the manufacturing device 106. For example, the device identifier 128 can include one or more indicators associated with specific components of the manufacturing device 106. As an example, each component of the manufacturing device 106 can have a visual code such as a QR code, barcode, or any visual code associated with the component. A device (e.g., the user device 102, the recording device 108) can scan the QR code to determine the identity of the component. The identity of the component can be used to facilitate completion of an LTT process. For example, a user of the user device 102 can scan the visual indicator associated with a component to determine if the component is the proper component indicated in a step of the LTT process. As another example, the user of the user device 102 can capture a picture of the visual indicator as well as a safety switch associated with the component to identify the component and indicate the component is rendered safe.

The recording device 108 can be any device capable of recording information. For example, the recording device 108 can be a video camera located within a manufacturing facility. The recording device 108 can have a device identifier 130 and a recording element 132. The recording element 132 can be any device capable of recording data such a still camera, a video camera, a microphone, and so forth. The recording element 132 can record completed steps of the LTT process in order to memorialize the completed steps. The recording device 108 can provide the recordings of the recording element 132 to the computing device 104 via the network 105 for storage within the database 118.

The recording device 108 can be associated with a device identifier 130. As an example, the device identifier 130 can be any identifier, token, character, string, or the like, for differentiating one device (e.g., recording device 108) from another device. The device identifier 130 can identify a recording device as belonging to a particular class of devices. As a further example, the device identifier 130 can comprise information relating to the recording device 108 such as a manufacturer, a model or type of device, a state of the recording device 108, a locator, and/or a label or classifier. Other information can be represented by the device identifier 130. For example, the device identifier 130 can be an internet protocol address, a network address, a media access control (MAC) address, an Internet address, or the like. As an example, the device identifier 130 can be relied upon to establish a communication session between the recording device 108 and the user device 102, the computing device 104, the manufacturing device 106, or other devices and/or networks. As a further example, the device identifier 130 can be used as an identifier or locator of the recording device 108 and/or another device (e.g., the manufacturing device 106). For example, the device identifier 130 can indicate a location of the recording device 108 as well as manufacturing devices that are visible to the recording device 108.

FIG. 2 is a diagram illustrating exemplary data structures. Specifically, FIG. 2 illustrates a user profile 200 and an LTT process profile 250. The user profile 200 and the LTT process profile 250 can be stored in a database (e.g., the database 118 and/or the forensic database 126 of FIG. 1). The database can contain more than one user profile 200 and more than one LTT process profile 250. For example, each user of a system (e.g., the system 100 of FIG. 1) may have an associated user profile 200. Further, each LTT process associated with the system may have an associated LTT process profile 250.

The user profile 200 comprises a user identifier 202, a user status 204, a user qualification 206, a user history 208, and user employment level 210. The user identifier 202 can be any identifier, token, character, string, or the like, for differentiating one user from another user. For example, the system can assign each user a unique user identifier 202 in order to keep track of one or more characteristics of the user, such as the user profile 200.

The user profile 200 can have a user status 204. The user status 204 can indicate the status of a user associated with the user profile 200. The user status 204 of the user can be associated with an LTT process. For example, the user status 204 can indicate that the user is attempting to complete the LTT process, and/or the user status 204 can indicate that the user is unable to complete any LTT processes. For example, the user associated with the user profile 200 may be suspended from performing any LTT process due to one or more variables, such as being associated with an accident that occurred during an LTT process or not having the requisite training required to perform an LTT process.

The user status 204 can also indicate a current location of a user. For example, the system can keep track of the location of a user throughout a facility, such as a building or a complex having one or more buildings. The location of the user can be used to monitor a user's location relative to machinery located throughout the facility to determine the safety and wellbeing of the user, as well as if the user is attempting to complete an LTT process within the facility. The user status 204 can be updated in real time based on the location of the user.

The user status 204 can also indicate one or more tasks assigned to a user. For example, a user can be assigned a task to complete an LTT process. The system can monitor the complete of the LTT process to ensure that the user is completely the aforementioned task. As another example, a user may be assigned a task to complete training with an LTT process. As a further example, a user may be assigned a task to audit and/or verify an LTT process to ensure that the LTT process is performing appropriately. The one or more tasks may be assigned to the user by a supervisor and/or manager of the user. As another example, the user may assign the one or more tasks to the user.

The user profile 200 can have a user qualification 206. The user qualification 206 can indicate one or more qualifications the user has. For example, the user can have completed training associated with one or more LTT processes. The user qualification 206 can be updated for each training completed to indicate that the user has completed the training and has the requisite user qualifications 206 for completing the LTT process associated with the training. The user qualification 206 can also indicate when a user may need additional training or when a qualification will expire. For example, a user may need to complete training at regular intervals (e.g., every few days, weeks, months, years, etc.) in order to comply with one or more standards associated with an LTT process. Accordingly, the system can utilize the user qualification 206 to determine whether a user is properly trained and/or qualified to complete an LTT process. Further, the system can utilize the user qualification 206 to indicate to users and/or managers of the user that a user needs requisite training in order to complete an LTT process. In this manner, the system can allow the training and qualifications of the user to be automated.

The user profile 200 can have a user history 208. The user history 208 can indicate all actions associated with any LTT process. For example, the user history 208 can indicate any LTT processes that the user has completed. Further, the user history 208 can indicate any steps that the user has completed or has failed to complete of an LTT process. As an example, a user may complete 8/10 steps of an LTT process. The user history 208 can store each step the user has completed in real time to monitor the user's actions. The system may take an action based on the user history 208. Returning to the above example of the user completing 8/10 steps of the LTT process, the user may attempt to perform maintenance on the device that the user was completing the LTT process for. The system may recognize that the LTT process has not been completed, and that the device is not safe to perform maintenance on. The system may send a notification to the user (e.g., by sending a notification to a user device associated with the user) to prevent the user from performing maintenance on the device. Further, the system can take additional steps to protect the safety of the user such as remotely cut power to the device in order to protect the user.

The user profile 200 can have a user employment level 210. The user employment level 210 can indicate the level of the user according to the employer. For example, a user can be designated as a manager and/or supervisor that has additional qualifications and capabilities as compared to a typical employee. Further, the user employment level 210 can indicate that a user is a trainee that is unable to complete any LTT process on the user's own. The system can use the user employment level 210 to indicate to one or more users (e.g., a supervisor of the user associated with the user profile 200) based on one or more actions of the user. For example, if the user is a trainee, the trainee may have the user qualification 206 to complete an LTT process, but needs to have a supervisor or another employee present to ensure that the is properly completing the LTT process. The system can recognize that a trainee is attempting to perform an LTT process without the proper supervision, and the system contact the supervisor of the trainee to notify the supervisor that the trainee is attempting to complete an LTT process without supervision.

As shown, the LTT process profile 250 comprises one or more user identifier 252, LTT requirements 254, LTT steps 256, LTT execution history 258, LTT audit data 260, and a LTT revision history 262. The LTT process profile 250 can be associated with a specific LTT process. The users identifiers 252 can indicate one or more users that have executed one or more steps of the LTT process. For example, the LTT process profile 250 can indicate which users have attempted to begin the LTT process, and each step that the user completed of the LTT process. Further, the user identifiers 252 can store any information associated with a user such as the user profile 200.

The LTT process profile 250 can have one or more LTT requirements 254. For example, the LTT requirements 254 may indicate the requisite qualifications required by a user (e.g., the user qualification 206). The LTT requirements 254 can also indicate the requirements required to modify the LTT process. For example, a normal user may not have the LTT requirements 254 required to modify the LTT process profile 250, but a supervisor may have the requisite LTT requirements 254 to modify the LTT process profile.

The LTT process profile 250 can indicate the one or more LTT steps 256 associated with the LTT process. For example, the LTT steps 256 can have detailed steps that a user must complete in order to properly deenergize a device. The LTT steps 256 can also indicate each user that has completed an associated step such that the LTT process profile 250 can monitor each of the steps completed by a user.

The LTT process profile 250 can have an LTT execution history 258. The LTT execution history 258 can indicate the users that have executed one or more steps of the LTT process. Further, the LTT execution history 258 can indicate the users that have not completed one or more steps of the LTT process. The LTT execution history 258 can also indicate any incidents that are associated with the LTT process. For example, if a user is injured while performing the LTT process, the LTT execution history 258 can store information associated with injury to allow another user, such as a supervisor, to determine on what step and/or why the user was injured during the LTT process.

The LTT process profile 250 can have LTT audit data 260. The LTT audit data 260 can indicate when the LTT process associated with the LTT process profile 250 was lasted audited. For example, if a user is injured while performing the LTT process, the system and/or a supervisor can request that the LTT process be audited to determine any problems with the LTT process. The LTT audit data 260 can indicate that an audit is currently occurring with the associated LTT process, and the system can prevent any users from attempting the LTT process until the audit is completed.

The LTT process profile 250 can have LTT revision history 262. For example, the LTT revision history 262 can maintain a record of all changes associated with the LTT process associated with the LTT process profile 250. Thus, during an audit, the system and/or the user can access the LTT revision history 262 to see what changes have been made to the LTT process to determine if a modification is causing any problems (e.g., injuries to users and/or devices).

Figure 3:
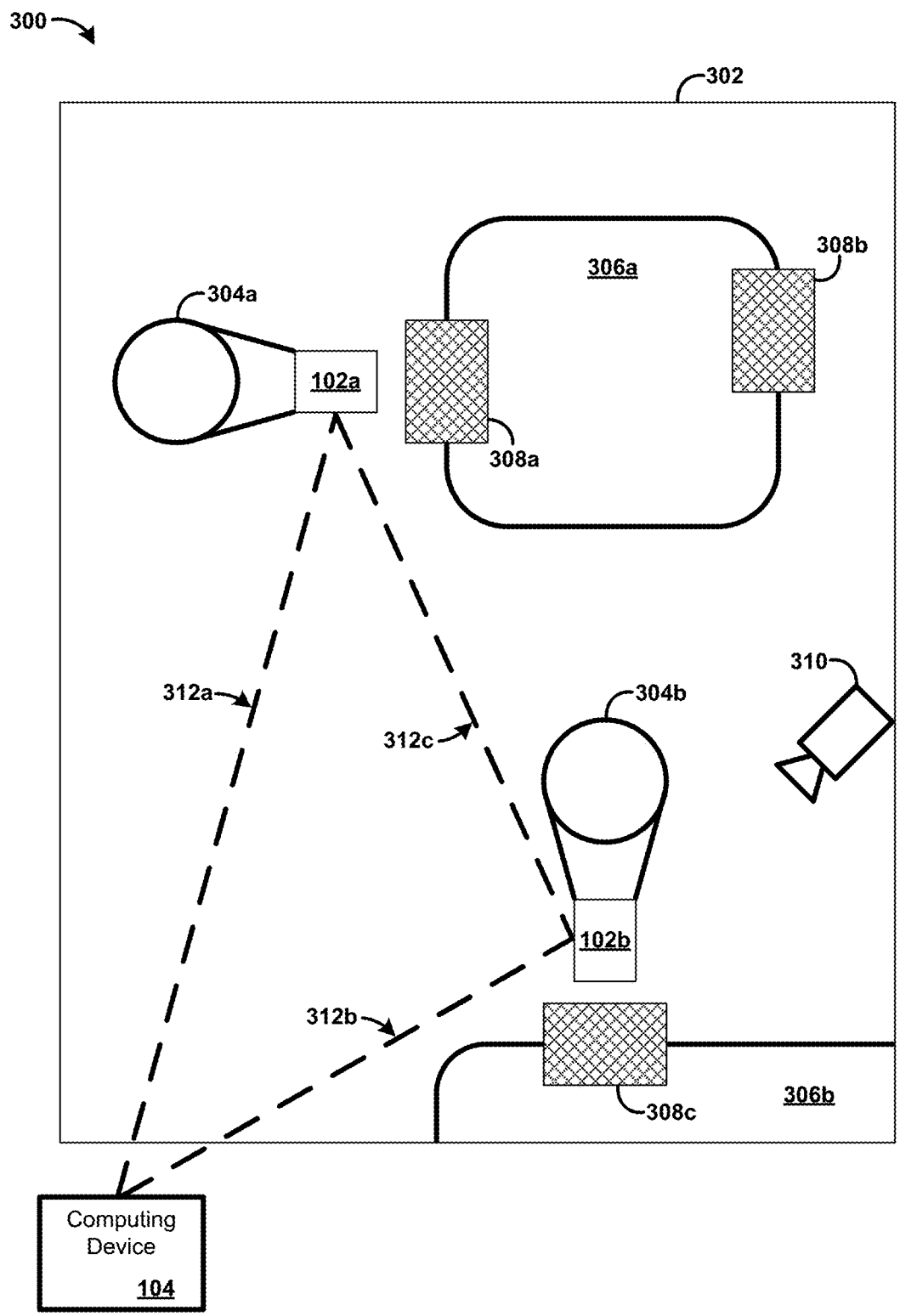
FIG. 3 is a diagram illustrating an exemplary system.

FIG. 3 illustrates an example of a system 300 for completing a Lock-Tag-Try (LTT) process. The system 300 comprises a manufacturing facility 302. The manufacturing facility 302 comprises users 304a and 304b, manufacturing devices 306a and 306b, indicators 308a, 308b and 308c, a camera 310, and a computing device 104. While the computing device 104 is shown as being external to the manufacturing facility 302, a person skilled in the art would appreciate that the computing device 104 can be located within the manufacturing facility 302.

As shown, communications links 312a, 312b, and 312c communicatively couple the user devices 102a and 102b, and the computing device 104 with one another. Specifically, the communication link 312a communicatively couples the user device 102a and the computing device 104; the communication link 312b communicatively couples the user device 102b with the computing device 104; and the communication link 312 communicatively couples the user devices 102a and 102b. The communications links 312a, 312b, and 312c can utilize any type of wired or wireless communication system. For example, the communications links 312a, 312b, and 312c can utilize the network 105 of FIG. 1. As another example, the communications links 312a, 312b, and 312c can be Wi-Fi connections between the user devices 102a and 102b, and the computing device 104. While the communications links 312a, 312b, and 312c are shown as directly connecting the user devices 102a and 102b, and the computing device 104 for ease of explanation, a person skilled in the art would appreciate that the communication can travel through additional devices (e.g., a wireless router, gateway, server, etc.). Additionally, while communication links are not shown coupled with the manufacturing devices 306a and 306b, as well as the camera 310, these devices may also communicate with the user devices 102a and 102b, and the computing device 104.

As shown, the user 304a is attempting to complete an LTT process on the manufacturing device 306a. Specifically, the user 304a is using the user device 102a to scan an indicator 308a associated with the manufacturing device 306a. For example, the indicator 308a can be a visual code (e.g., a QR code) on and/or adjacent to the manufacturing device 306a. The indicator 308a can be an indicator that starts an LTT process associated with the manufacturing device 306a so that the user 304a can render the manufacturing device 306a safe in order to perform maintenance on the manufacturing device 306a. As another example, the indicator 308a can be associated with a specific component of the manufacturing device 306a. When the user 304a uses the user device 102a to scan the indicator 308a, the user device 102a transmits data associated with the indicator 308a to the computing device 104 via the communication link 312a.

When the computing device 104 receives the data associated with the indicator 308a, the computing device 104 can determine an LTT process associated with the indicator 308a. For example, the computing device 104 can search a database (e.g., the LTT process database 122 of FIG. 1) to find an LTT process that is associated with the indicator 308a. The computing device 104 can determine an LTT process profile (e.g., the LTT process profile 250 of FIG. 2) associated with the indicator 308a. The computing device 104 can also create a data storage element (e.g., a data object, a data entry, etc.) that is associated with the user 304a and/or the user device 102a in order to monitor and/or track information related to the determined LTT process as the LTT process is completed. For example, the computing device 104 can either generate and/or identify a user profile 200 of FIG. 2 associated with the user 304a and/or the user device 102a. The computing device 104 can transmit the determined LTT process to the user device 102a in order to allow the user 304a to complete the LTT process. For example, the computing device 104 can transmit all or part of the LTT process profile 250 of FIG. 2 to the user device 102a.

The computing device 104 can determine whether the user 304a has the proper credentials for completing the LTT process requested by the user 304a. For example, prior to sending the LTT process profile 250 to the user device 102a, the computing device 104 may determine (e.g., using the user profile 200) that the user has the proper qualifications to execute the LTT process 250. The computing device 104 can compare all or part of the user profile 200 to the LTT requirements 254 of the LTT process profile 250 associated with the requested LTT process. As an example, the computing device 104 may determine that based on the user qualification 206 of the user profile 200 and the LTT requirements 254 of the LTT process profile 250 that the user 304a has the proper qualifications to complete the LTT process. After determining the user 304a is qualified to perform the LTT process, the computing device 104 may send the LTT process profile 250 to the user device 102a. If the user 304a does not have the proper qualifications for completing the LTT process, the computing device 104 may send a notification to the user device 102a to inform the user 304a that the user 304a does not have the proper qualifications to perform the LTT process. Additionally, the computing device 104 may inform a supervisor of the user 304a that the user 304a is attempting to complete an LTT process that the user 304a is not qualified to perform. For example, the computing device 104 can determine based on the user profile 200 a supervisor for the user 304a, and the computing device 104 can send a notification to the supervisor informing the supervisor that the user 304a attempted to complete an LTT process that the user 304a is not qualified to perform.

The user device 102a can present the LTT process to the user 304a. For example, after receiving the determined LTT process, the user device 102a can present the received LTT process to the user 304a. The LTT process can indicate a first step for the user 304a to take, such as locating an isolation point of the manufacturing device 306a. As an example, the indicator 308b can indicate the isolation point. The isolation point can include the functionality to isolate, de-energize, and/or power down at least one component of the manufacturing device 306a such that the user 304a can safely perform maintenance on the manufacturing device 306a. For example, the isolation point can be a mechanical switch and/or lever that the user 304a needs to actuate in order to isolate and/or power down the portion of the manufacturing device 306a.

The user device 102a can provide the user 304a with directions to a specific manufacturing device and/or component. For example, the user 304a needs to travel to the indicator 308b in order to isolate, de-energize, and/or power down at least one component of the manufacturing device. Since the user is currently located in front of the indicator 306a based on the user 304a scanning the indicator 306a, the computing device 102a can provide the user with step-by-step directions to direct the user 304a to the indicator 308b. For example, the computing device 104 can transmit, via the communication link 312a, instructions to the user device 102a to guide the user to the proper component that needs to be deactivated and/or an indicator (e.g., the indicator 308b) associated with the proper component. The user device 102a can provide location information associated with the user 304a to the computing device 104 to facilitate the computing device 104 providing the proper directions to the user device 102a to complete the LTT process. The computing device 104 can store the data associated with the location of the user device 102a to monitor the location of the user 304a to confirm the user 304a is properly executing the LTT process. The computing device 104 can store the data within the database 118 and/or the forensic database 126 of FIG. 1.

The user 304a can travel to the indicator 308b, and scan the indicator 308b using the user device 102a. When the user 304a uses the user device 102a to scan the indicator 308b, the user device 102a transmits a notification to the computing device 104 via the communication link 312a. For example, the user device 102a transmits data associated with the indicator 308b to the computing device 104. When the computing device 104 receives the data associated with the indicator 308b, the computing device 104 can determine that the user 304a is located in front of the isolation point. The computing device 104 can store data (e.g., in the database 118 of FIG. 1) indicating that the user 304a is now located in front of the isolation point. The computing device 104 can transmit a notification to the user device 102a indicating completion of the step. For example, the computing device 104 can transmit an indication to the user device 102a confirmation that the user device 102a is now located in front of the proper component (e.g., the isolation point). The computing device 104 can update the user profile 200 of FIG. 2 and/or the LTT process profile 250 of FIG. 2 to reflect that the user 304a has completed the step of the LTT process. In an example, the computing device 104 can transmit the next step in the LTT process to the user device 102a for the user 304a to deactivate the isolation point associated with the indicator 308b. As another example, the computing device 104 can transmit an indication to the user device 102a to proceed to the next step in the LTT process.

The user device 102a can instruct the user 304a to actuate and/or disable the isolation point. For example, the next step in the LTT process can comprise the user 304a turning off the isolation point associated with the indicator 308b. The user device 102a can further instruct the user 304a to record completion of the isolation point being actuated and/or disabled. For example, the user device 102a can instruct the user 304a to take a photo and/or video of the isolation point being actuated and/or disabled. As an example, the user 304a can be instructed to hang a tag on the isolation point indicating the isolation point is actuated and/or disabled, and once the tag is hung, use the user device 102a to record proof (e.g., take a photo and/or video) that the tag is hung on the isolation point. While recording of the isolation point being actuated and/or disabled is described as occurring after scanning the indicator 308b for ease of explanation, a person would appreciate that the recording of the isolation point being actuated and/or disabled can occur concurrently with the scanning of the indicator 308b.

After the user 304a records the isolation point being actuated and/or disabled on the user device 102a, the user device 102a transmits a notification to the computing device 104 via the communication link 312a to indicate the isolation point has been actuated and/or disabled. For example, the user device 102a transmits the recordation (e.g., a picture) of the isolation point being actuated and/or disable to the computing device 104. As another example, the camera 310 can capture the recording. For example, the computing device 104 can instruct the camera 310 to aim at the isolation point (e.g., the indicator 308b) and begin recording to capture the user 304a actuating and/or disabling the isolation point. When the computing device 104 receives the recordation, the computing device 104 can store the recordation (e.g., in the database 118 and/or the forensic database 126 of FIG. 1) indicating that the user 304a successfully isolated the isolation point. The computing device 104 can update data associated with the user profile 200 and/or the LTT process profile 250 of FIG. 2 to indicate completion of the step.

The computing device 104 can transmit a notification to the user device 102a indicating completion of the step. For example, the computing device 104 can transmit a notification indicating the one or more components of the manufacturing device 306a are now isolated and/or deactivated. Further, the computing device 104 can transmit data indicating the one or more components of the manufacturing device 306a are not isolated, and still need to be isolated and/or deactivated before the user 304a can safely perform maintenance on the manufacturing device 306a. If all components of the manufacturing device 306a are properly isolated, the computing device 104 can transmit a notification to the user device 102a to inform the user 304a that the LTT process is successfully completed, and that the user 304a may safely perform the maintenance. While the performance of the LTT process has been described with the user device 102a communicating with the computing device 104 for ease of explanation, the user device 102a can complete the LTT process without communicating with the computing device 104. That is, the user device 102a can provide steps of the LTT process to the user 304a, record completion of the steps, and verify the LTT process was successfully completed without a network connection (e.g., communication with the computing device 104). The user device 102a may provide the recordation of the LTT process to the computing device 104 after the completion of the LTT process when the user device 102a is able to communicate with the computing device 104.

In an example, at the start of the LTT process, the user device 102a and/or the computing device 104 can transmit a notification to one or more additional users or user devices within the manufacturing facility informing them of the start of the LTT process. For example, the user device 102a can transmit a notification to the user device 102b via the communications link 312c to indicate to the user 304b that the user 304a is about to start the LTT process on the manufacturing device 306a. As another example, the computing device 104 can transmit the notification to the user device 102b to indicate to the user 304b that the user 304a is about to start the LTT process on the manufacturing device 306a. The user 304b may be prevented from performing any maintenance on any other devices (e.g., the manufacturing device 306b) during the LTT process. Alternatively, the user 304b may need to assist in the LTT process by isolating one or more components of another device (e.g., the manufacturing device 306b). For example, the user 304b can perform an LTT process on the manufacturing device 306b in order to allow the user 306a to complete the LTT process associated with the manufacturing device 306a. As an example, the user 306a may not be able to complete their LTT process until the LTT process for shutting down the manufacturing device 306b is completed. Thus, the user 304b can perform an LTT process on the manufacturing device 306b in order to allow the user 306a to complete their LTT process. In this manner, the system 300 is capable of managing a group of users performing one or more LTT processes simultaneously, as well as notifying any users of the start and/or end of an LTT process within the manufacturing facility.

Once the user 304a is finished performing maintenance on the manufacturing device 306a, the computing device 104 can provide instructions to the user device 102a to reactivate and/or energize the manufacturing device 306a. While the steps of reactivating the manufacturing device 306a are not described in detail for ease of explanation, a person skilled in the art would appreciate that reactivating the manufacturing device 306a may be similar (e.g., the reverse) to the steps described above.

FIGS. 4A-4F illustrate an exemplary system 400. The system 400 comprises a user device 102 comprising a display 402 and an input 404. The display 402 can be a touchscreen display. The input 404 can be any input device such as a button, a keyboard, and/or a switch. The input 404 can be a mechanical or digital input.

Figure 4A:
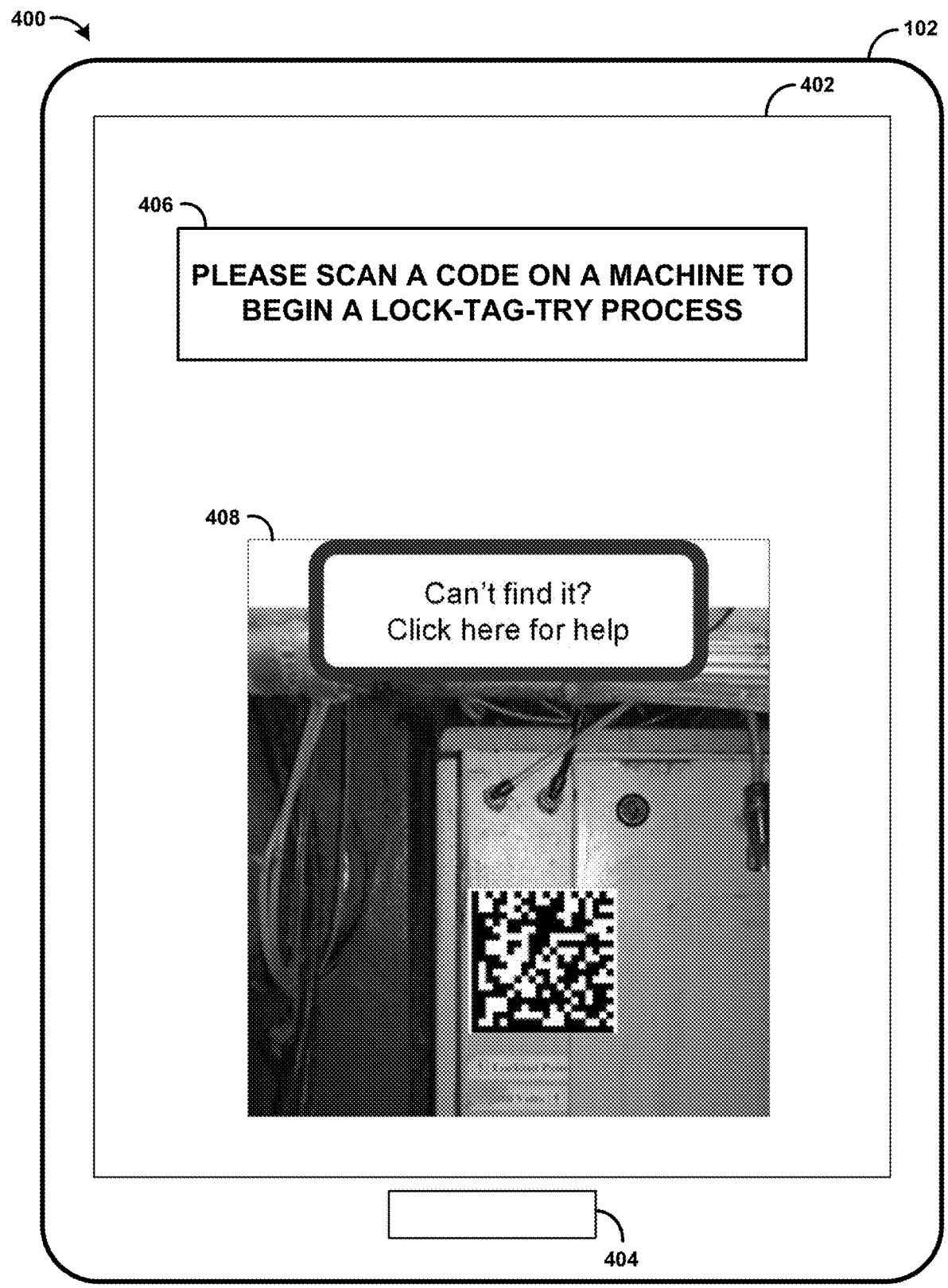
FIGS. 4A-4F illustrate an exemplary interface.

FIG. 4A illustrates an interface that may be presented to a user of the user device 102. The display 402 is displaying an interface when a user is attempting to begin an LTT process associated with a machine. Specifically, the interface element 406 instructs the user to scan a code on a machine to begin the LTT process. The interface element 408 can provide a real time view of what a camera of the user device 102 is currently capturing. As shown, the interface element 408 is displaying a data matrix (e.g., a QR code), as well as a dialog box for a user to interact with if the user is having trouble locating the data matrix.

Figure 4B:
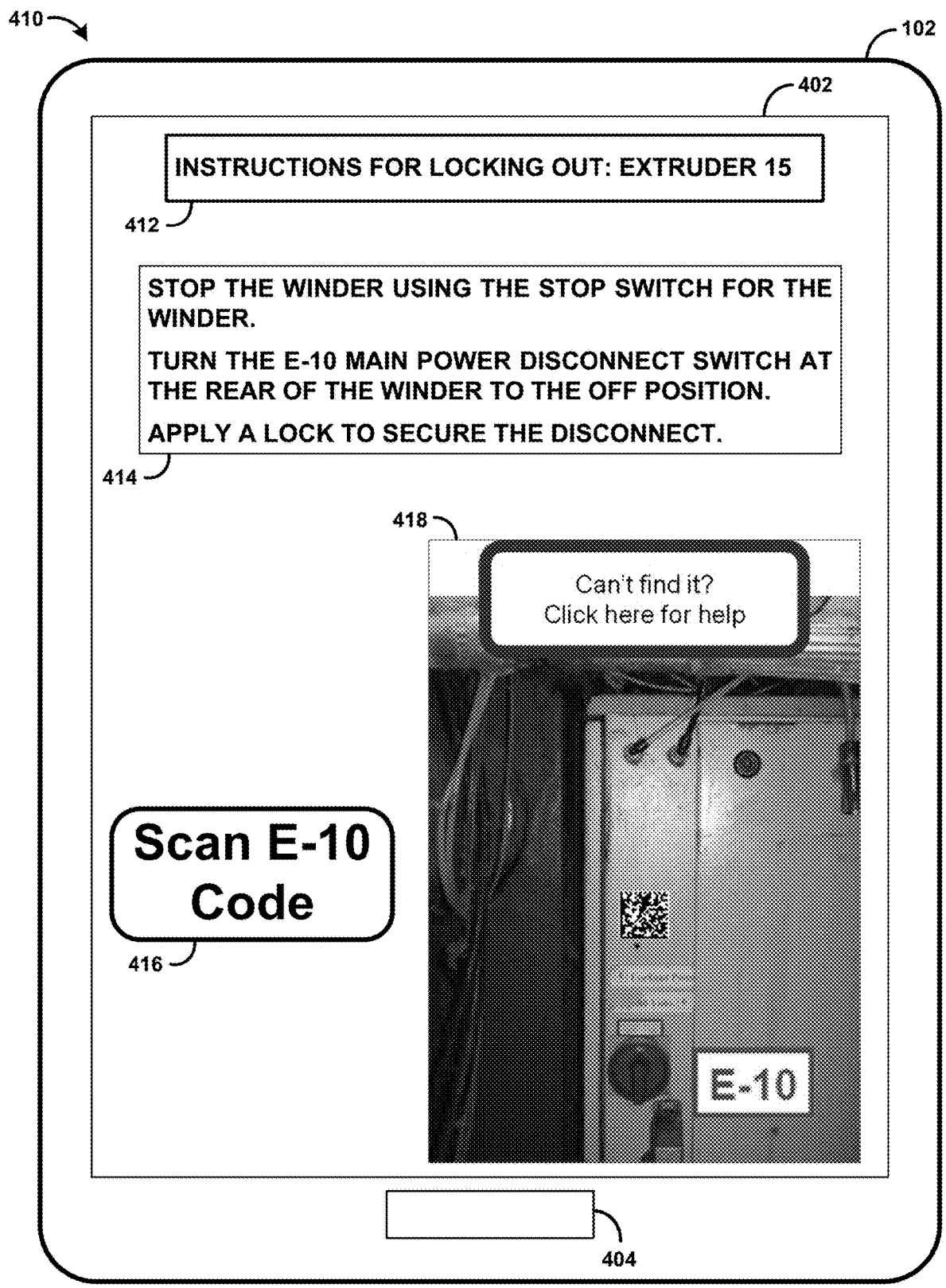

FIG. 4B illustrates an interface that may be presented to the user of the user device 102. Specifically, the display 402 is displaying an interface when a user is attempting to complete a step in the LTT process. Specifically, the interface element 412 is indicating that the display 402 is displaying instructions for locking out an extruder 15. The interface element 414 is indicating several steps of the LTT process. The interface element 416 is indicating the current step of the LTT process that the user needs to complete. Specifically, the interface element 416 is instructing the user to scan an E-10 code. The interface element 418 is displaying a data matrix, a label indicating the data matrix is the E-10 code, as well as a dialog box for a user to interact with if the user is having trouble locating the E-10 code.

Figure 4C:
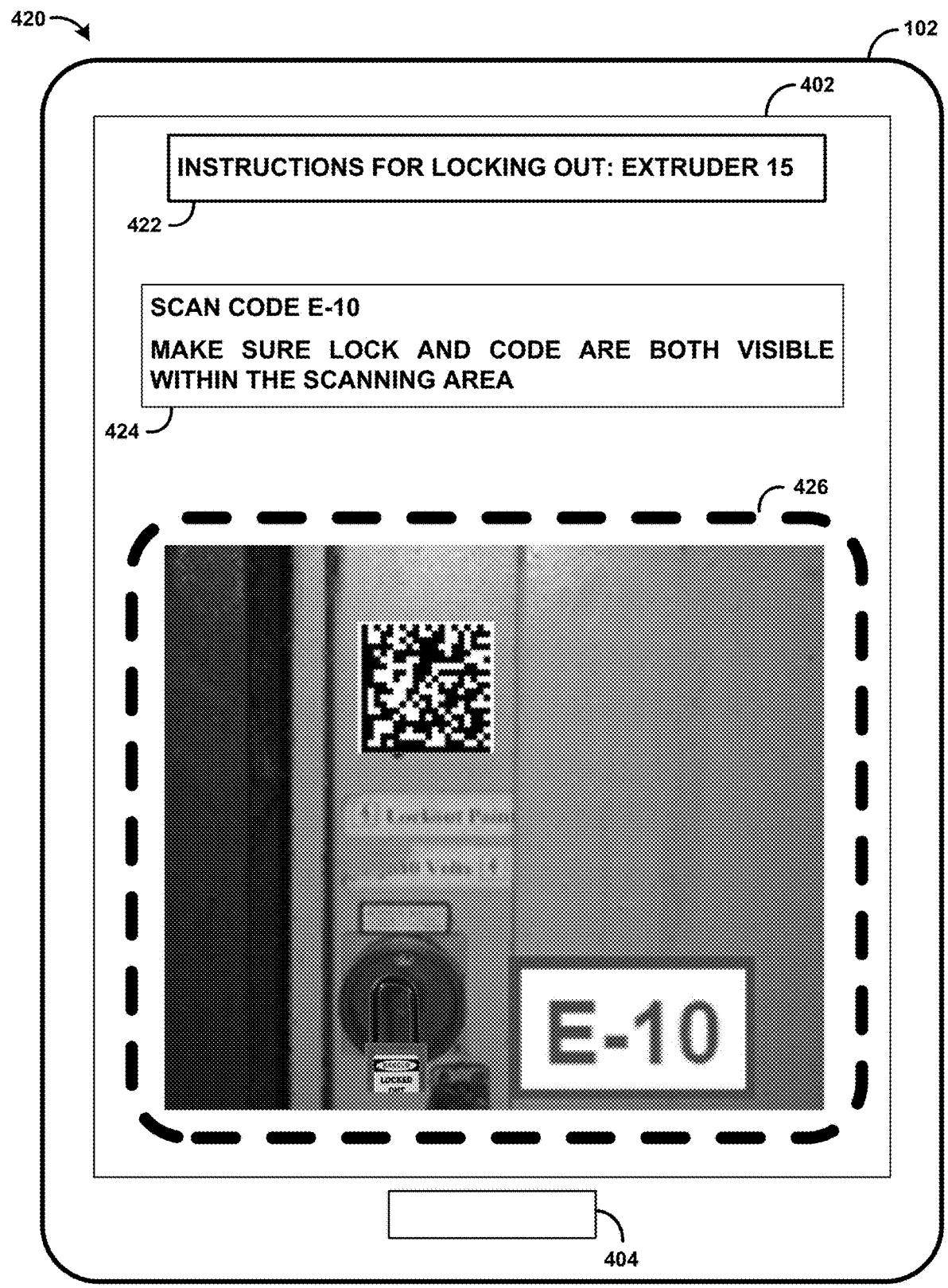

FIG. 4C illustrates an interface that may be presented to a user of the user device 102. Specifically, the display 402 is displaying an interface when a user is attempting to scan evidence that a step in the LTT process is completed. Specifically, the interface element 422 is indicating that the display 402 is displaying instructions for locking out an extruder 15. The interface element 424 is indicating the current step of the LTT process that the user needs to complete. Specifically, the interface element 424 is instructing the user to capture a photo of a lock on a component of a manufacturing device and the E-10 code. The interface element 426 is displaying the data matrix, a label indicating the data matrix is the E-10 code, as well the lock on the component of the manufacturing device. Further, the interface element 426 contains a dashed border to indicate the scan has not been successfully completed. The border and/or the interface element 426 can be a color (e.g., red) to indicate the scan has not been completed. In an example, the use device 102 can store all instructions displayed to the user to record the exact steps displayed to the user of the user device 102.

Figure 4D:
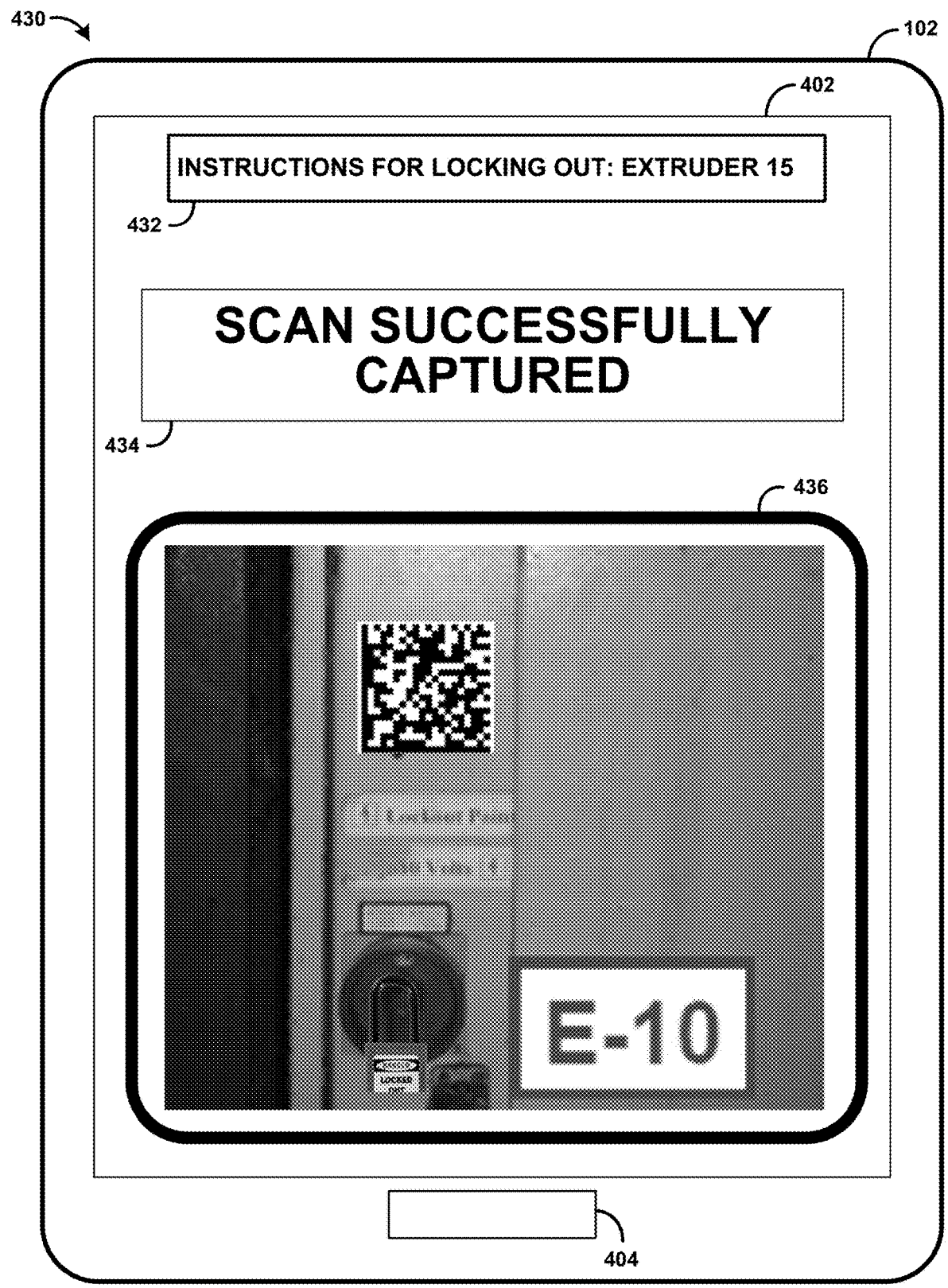

FIG. 4D illustrates an interface that may be presented to a user of the user device 102. Specifically, the display 402 is displaying an interface when a user is attempting to scan evidence that a step in the LTT process is completed. Specifically, the interface element 432 is indicating that the display 402 is displaying instructions for locking out an extruder 15. The interface element 434 is indicating the current step of the LTT process that the user needs to complete. Specifically, the interface element 434 is indicating that the scan has been successfully captured. The interface element 436 is displaying the data matrix, a label indicating the data matrix is the E-10 code, as well the lock on the component of the manufacturing device. Further, the interface element 436 contains a solid border to indicate the scan has been successfully completed. The border and/or the interface element 426 can be a color (e.g., green) to indicate the scan has been successfully completed. In an example, the use device 102 can store all images captured by the user of the user device 102 to record the execution of the LTT process. The user device 102 can transmit the captured images to the computing device 104. The computing device 104 can store the captured images in the database 118 and/or the forensic database 126 of FIG. 1. The computing device 104 can update the data stored within the user profile 200 and the LTT process 250 to story a forensic trail (e.g., a history of steps completed by the user of the user device 102) to ensure the LTT process is completed appropriately.

Figure 4E:
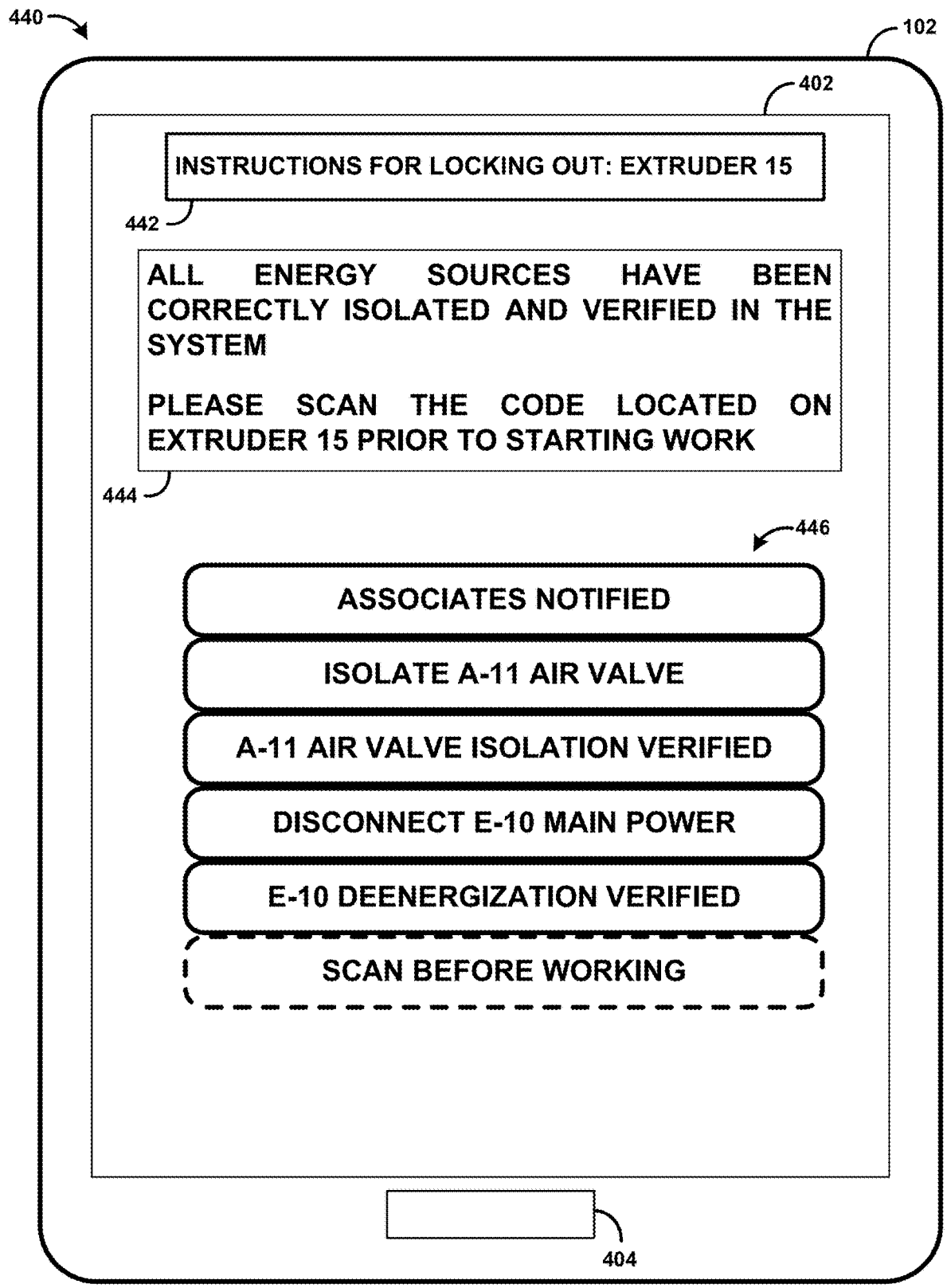

FIG. 4E illustrates an interface that may be presented to a user of the user device 102. Specifically, the display 402 is displaying an interface when a user is attempting to scan evidence that a step in the LTT process is completed. Specifically, the interface element 442 is indicating that the display 402 is displaying instructions for locking out an extruder 15. The interface element 444 is indicating the current step of the LTT process that the user needs to complete. Specifically, the interface element 444 is indicating that the user has correctly isolated the system, and the isolation has been verified. The computing device 104 can verify the isolation by utilizing one or more sensors associated with the extruder 15 to determine that the extruder 15 is properly deenergized. For example, the computing device 104 can receive a notification from the computing device 102 that the user has performed the steps to deenergize the extruder 15. The computing device 104 can determine whether the extruder 15 has actually been deenergized based on the one or more sensors associated with the extruder 15. Upon verifying that the extruder 15 has been properly deenergized, the computing device 104 can send a notification to the user device 102 indicating that the deenergization is verified.

The interface element 444 is further instructing the user to scan the code on the extruder 15 prior to starting work. The interface element 446 is indicating the steps of the LTT process. Specifically, the interface element 446 is indicating the steps that have been completed in a solid border, and the steps that have not been completed in a dashed border. The interface element 446 can also indicate the completed steps in a color (e.g., green), and the steps that have not been completed in a different color (e.g., red). The interface element 446 can also indicate whether a step has been verified by the computing device 104. For example, completed steps may be shown in yellow to indicate the steps are completed, but not yet verified. Once the step is verified by the computing device 104, the interface element 446 may modify the color of the steps from yellow to green to indicate the completed step has been verified by the computing device 104.

Figure 4F:
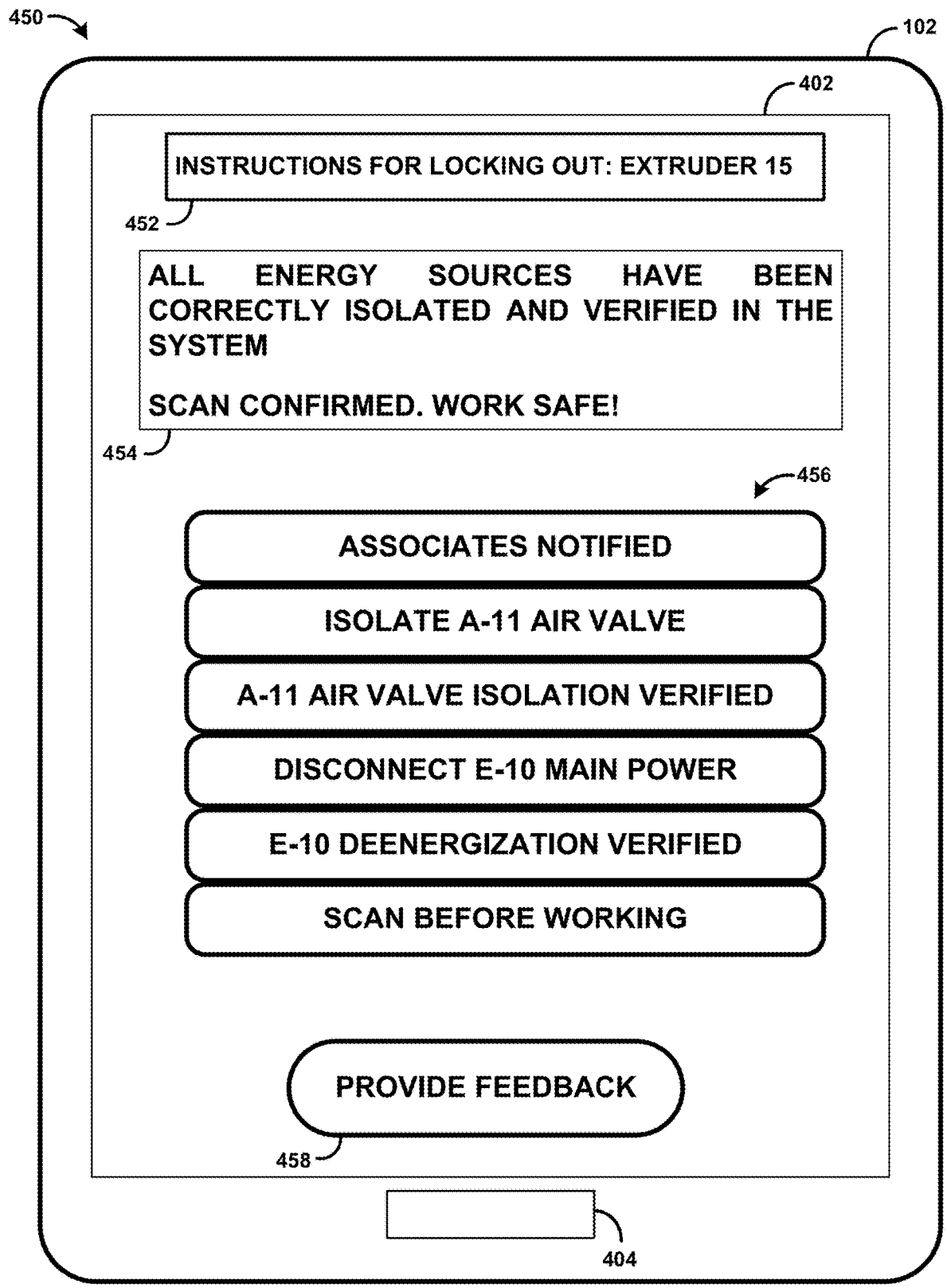

FIG. 4F illustrates an interface that may be presented to a user of the user device 102. Specifically, the display 402 is displaying an interface when a user is attempting to scan evidence that a step in the LTT process is completed. Specifically, the interface element 452 is indicating that the display 402 is displaying instructions for locking out an extruder 15. The interface element 454 is indicating the current step of the LTT process that the user needs to complete. Specifically, the interface element 454 is indicating that the user has correctly completed the LTT process, and the user may safely work on the machine. The interface element 456 is indicating the steps of the LTT process. Specifically, the interface element 456 is indicating that all the steps that have been successfully completed by having the steps surrounded by a solid border. The interface element 456 can also indicate the completed steps in a color (e.g., green). The interface element 458 is indicating the user can provide feedback by interacting with the interface element 458. That is, the user can interact with the interface element 458 to indicate that the user desires to provide feedback (e.g., on the LTT process).

FIG. 5 is a flowchart of an example method 500. At step 510, an indicator (e.g., the device identifier 128 of FIG. 1 and/or the indicators 308 of FIG. 3) associated with a component may be scanned. For example, a computing device (e.g., the user device 102 and/or the recording device 108 of FIG. 1) can scan the indicator. As an example, a user (e.g., the users 304 of FIG. 3) can cause the computing device to scan the indicator. The component can be associated with a manufacturing device (e.g., the manufacturing device 106 of FIG. 1 and/or the manufacturing devices 306 of FIG. 3). While a component is described for ease of explanation, a person skilled in the art would appreciate that the indicator may be associated with the manufacturing device.

At step 520, one or more content items associated with the indicator may be requested. For example, a user device (e.g., the user device 102 of FIG. 1) can request the one or more content items associated with the indicator after scanning the indicator. The content items can be associated with a Lock-Tag-Try (LTT) process. As an example, the user device can transmit a request to a computing device (e.g., the computing device 104) for a content item associated with the component. The content items can be a step-by-step manual for completing an LTT process associated with the component.

At step 530, one or more content items associated with the indicator may be received. For example, the user device can receive a manual associated with the LTT process for the component.

At step 540, the one or more content items are displayed to guide a user of the user device through the LTT process. For example, the user device can display the step-by-step process for the user to complete the LTT process so that the user may perform maintenance on the component. The user device can also capture proof of completion of the steps of the LTT in order to ensure the LTT process was correctly executed.

FIG. 6 is a flowchart of an example method 600. At step 610, one or more content items associated with one or more components that have one or more indicators (e.g., the device identifier 128 of FIG. 1 and/or the indicators 308 of FIG. 3) are stored. For example, a computing device (e.g., the computing device 104 of FIG. 1) can store processes for completing an LTT process in a database (e.g., the database 118 of FIG. 1). As an example, the computing device can store step-by-step manuals for completing the LTT process associated with the components (e.g., in the LTT process profile 250 of FIG. 2). Additionally, the computing device can store step-by-step instructions for completing an LTT process for a manufacturing device (e.g., the manufacturing device 106 of FIG. 1 and/or the manufacturing devices 306 of FIG. 3).

At step 620, a request for one or more content items associated with an indicator are requested (e.g., by the user device 102 of FIG. 1). For example, a user device can transmit the request to the computing device in response to the user device scanning the indicator associated with a component. The user device can send a profile associated with a user of the user device (e.g., the user profile 200 of FIG. 2) to the computing device.

At step 630, one or more content items associated with the indicator are determined. For example, the computing device can search a database (e.g., the database 118 of FIG. 1) to determine the one or more content items. As an example, the computing device can search the database for an LTT process (e.g., the LTT process profile 250 of FIG. 2) that is associated with the component indicated by the indicator. The computing device can determine whether the user requesting the LTT process has the proper qualifications (e.g., the user qualification 206 of FIG. 2) to complete the LTT process based on the requirements of the LTT process (e.g., the LTT requirements 254 of FIG. 2). The computing device can store data (e.g., in the database 118 and/or the forensic database 126 of FIG. 1) that indicates the user that has requested the LTT process.

At step 640, the one or more determined content items are transmitted. For example, the computing device can transmit the determined content items (e.g., the LTT process profile 250 of FIG. 2) to the user device. As an example, the computing device transmits the LTT process associated with the component to the user device. The computing device can transmit the determined content items after determining the user requesting the LTT process has the proper qualifications to perform the LTT process. If the user does not have the proper qualifications, the computing device may send a notification to the user device indicating that the user is unable to complete the LTT process.

At step 650, one or more notifications associated with a user performing the LTT process are received. For example, the computing device can receive notifications from the user device. As an example, the user device can transmit the notifications to the computing device indicating completion of each step of the LTT process. The notifications may comprise one or more images that are captured to indicate the completion of each step of the LTT process.

At step 660, the one or more notifications associated with the user performing the LTT process are stored. For example, the computing device can store the notifications in a database (e.g., the Lock-Tag-Try process data 122 and/or the forensic database 126 of FIG. 1). As an example, the computing device stores each of the notifications and/or instructions displayed to and/or evidence captured by the user (e.g., in the forensic database 126 of FIG. 1) to create a forensic trail of the LTT process being completed by the user. The computing device can verify that the step has been completed by utilizing one or more sensors associated with the machine that the user is performing the LTT process on. For example, the computing device can verify that the user has properly deenergized the machine by utilizing data provided by power sensors associated with the machine that indicate that the machine does not have power. The computing device can send a notification to the user device indicating that completion of the step has been verified. The computing device can also verify that the step has been completed by the user based on a record that the user provided, via the user device, to the computing device. For example, the computing device can verify that the step has been completed based on a photo and/or video that the user captured via the user device.

Figure 7:
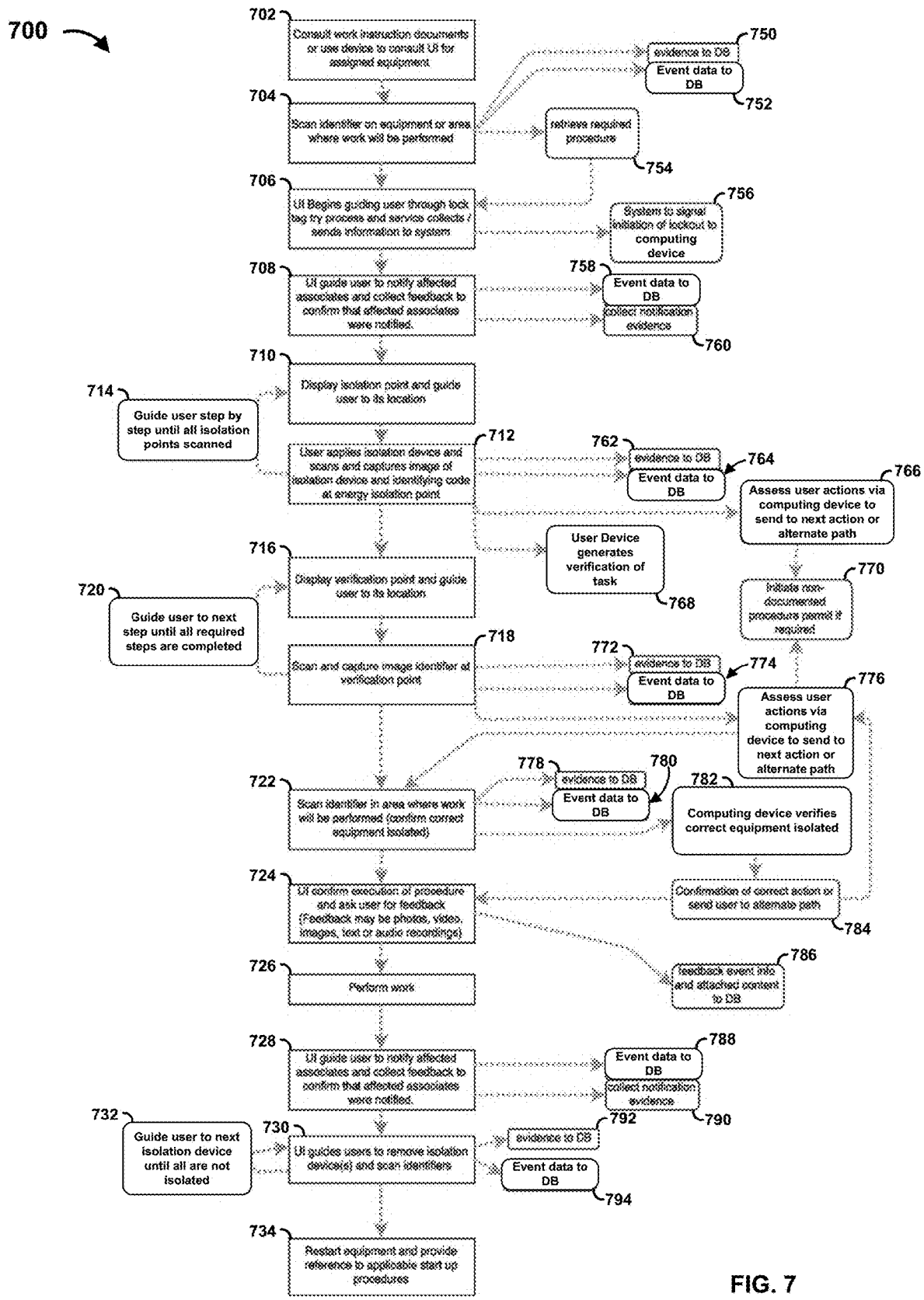
FIG. 7 is a flowchart of an example method.

FIG. 7 illustrates a flowchart that provides additional detail to the flowcharts of FIGS. 5 and 6. Specifically, FIG. 7 illustrates a detailed method 700 for completing a Lock-out-Tag-Try (LTT) process by a single user. At step 702, a user may consult work instruction document or a user to device (e.g., the user device 102 of FIG. 1) to consult a UI for assigned equipment. For example, the user device may provide the user with a device the user is supposed to complete an LTT process on.

At step 704, an identifier or equipment or area where work will be performed is scanned (e.g., by the user device). The user device may scan an indicator (e.g., the indicators 308 of FIG. 3). The user device may send a notification of the scanned indicator to a computing device (e.g., the computing device 104 of FIG. 1). The computing device can retrieve the required LTT process at step 754. The computing device can send the LTT process (e.g., the LTT process profile 250 of FIG. 2) to the user device to facilitate the user device completing the LTT process. In response to completing step 704, the user device may send evidence to a database (e.g., the database 118 and/or the forensic database 126 of FIG. 1) an step 740. Further, the user device can send event data in step 752 to the database.

At step 706, the UI of the user device begins guiding the user through the LTT process. The user device can provide step-by-step instructions to the user of the user device to complete the LTT process. The user device may send a signal (e.g., a notification) to the computing device that the user is about to begin the LTT process in step 756.

At step 708, a notification can be sent to one or more other users to indicate the LTT process is about to begin. The computing device can receive the notification from the user device, and the computing device can use the information in a database (e.g., the database 118) to communicate to the one or more other user devices that the LTT process is about to begin. For example, the computing device can determine any user devices that are in proximity to the user device starting the LTT process, and the computing device can notify the determined user devices that the LTT process is about to begin. In this manner, the method 700 can inform any users that may be impacted by the LTT process. The computing device can determine that the notifications were received by the users impacted by the LTT process based on receiving one or more responses (e.g., feedback) from the users impacted by the LTT process. At step 758, the computing device may store the event data in the database. At step 760, the computing device can collect and store the notification data.

At step 710, an isolation point associated with the machine for the LTT process may be displayed along with information to guide the user to the isolation point. For example, the user device may utilize the location of the user device to determine the location of the user relative to the isolation point. Based on the location of the user device and the location of the isolation point, the user device can provide the user with instructions to guide (e.g., direct) the user to the isolation point. The user device can provide the instructions in real time to the user. In another example, the computing device can provide the user with instructions to guide the user to the isolation point. As an example, the user device can provide the location of the user device to the computing device, and the computing device can determine the instructions to guide the user to the isolation point. The computing device can then provide the instructions to the user device in order to provide the user with the instructions to the isolation point.

At step 712, the user applies an isolation device (e.g., a lock) at the isolation point. The user device then captures images of the isolation device and the identifying code at the isolation point to capture evidence that the step of securing the isolation point is completed. The user device can cause the evidence that the isolation point is secure to be stored in a database in step 762. For example, the user device can send the evidence to the computing device so that the computing device stores the evidence in the database. The user device can cause event evidence to be stored in a database in step 764. For example, the user device can indicate the isolation step is completed (e.g., the event evidence) to the computing device. The computing device can then store the event evidence in the database. At step 766, based on the LTT process, the computing device assess the user actions to send the user to the next action or an alternate path. For example, if the machine is full isolated, but another machine needs to be isolated to complete the LTT process, the computing device can provide instructions to the user device to inform the user to move on to the next machine for isolation. At step 768, the user device generates verification of a task. The user device can utilize a camera to capture verification that a task has been completed. The user device can provide the verification that the task has been completed to the computing device. At step 770, non-document procedure may be initiated as necessary. For example, there may be an error with the LTT process that the user knows needs to be corrected, but the step-by-step guides is missing a step. Thus, the user device can request that the user act outside of the LTT process to complete isolation of the machine as necessary.

At step 714, the user is guided step-by-step until all isolation points are scanned. That is, the user completes steps 712, 762, 764, and 768 until all the isolation points are scanned and isolated. Once all isolation points have been isolated, the user device can provide a notification to the computing device to inform the computing device that all isolation points have been isolated.

At step 716, the verification point may be displayed and the user can be guided to the verification point's location. The user device can provide the user directions to the verification point. The user device can provide the location of the user device to the computing device and the computing device can provide the instructions to the user device based on the location of the user device.

At step 718, an image may be scanned and captured of the verification point by the user device. The image can be a photograph or a video. At step 772, the captured information may be sent to the database. The user device can scan an identifier at the verification point to confirm that the user device is at the verification point. The verification point can be used by the user device and/or the computing device to verify that the user has completed all the appropriate steps in a group of steps of the LTT process. For example, the steps may be to isolate one section of the machine in the LTT process. The verification point can signal to the computing device and/or the user device that the user believes the user has completed all steps for isolating the one section of the machine. The computing device can verify the one section of the machine is properly isolated by utilizing one or more sensors associated with the one section of the machine. As another example, the computing device can verify the one section of the machine is properly isolated based on the information (e.g., the captured images and/or videos) sent by the user device to the computing device. At step 774, the computing device and/or the user device stores information indicating the user requested verification.

At step 776, the user actions are assessed. The computing device may determine that the user has completed all the necessary steps for completing the section of the LTT process, and provide data to the user device to facilitate the user moving to the next step of the LTT process. The computing device can determine that the user has not completed all the proper steps. That is, the computing device may not verify the steps that the user has completed. In response to determining that the user has not verified all steps, the computing device may send one or more instructions to the user device to guide the user to the unverified steps so that the user can correct the errors associated with the LTT process.

At step 720, the user is guided to the next step until all required steps are completed. Stated differently, steps 716 and 718 of the method 700 are repeated until the steps of the LTT process to isolate the machine are completed. For example, a machine may have 4 different sections that the need to be individually isolated before work can occur on the machine. Thus, once the user completes 1 section of the LTT process to isolate the 1 section, the computing device and/or the user device can provide the user with the steps for isolating the next section of the machine and so on until the machine is fully isolated.

At step 722, the user device scans an identifier in the area where work will be performed. The user device can provide the scanned identifier to the computing device. The computing device can utilize the scanned identifier to verify that the equipment that the user intended to isolate is in fact the equipment that the user has correctly isolated and verified, as will be explained in more detail below at step 782. At step 778, the scanned identifier can be stored in the database (e.g., by the computing device). At step 780, the event data can be stored in the database (e.g., by the computing device).

At step 782, the computing device verifies the correct equipment is isolated. The computing device can utilize the identifier to determine that all steps have been properly completed to isolate all parts necessary for the area the user device has indicated that the user would like to work. The computing device can use the database to determine the correct equipment is isolated. The computing device can use one or more sensors associated with the equipment to verify that the equipment does not have power so that the user can safely work on the machine. At step 784, the computing device sends a notification to the user device informing the user device whether the equipment is isolated or not isolated. If the equipment is isolated, the computing device can send a notification that directs the user to perform the maintenance on the machine. If the equipment is not isolated, the computing device can send a notification to the user device indicating the device is not safe for work. Further, the computing device can send one or more steps to the user device so that the user can correct the deficiencies with the LTT process. The user device can provide the one or more steps to the user to correct the deficiencies with the LTT process. Thus, the user does not have to go through every step of the LTT process to isolate the machine because the computing device can provide the user device with only the steps that have not been completed properly.

At step 724, the computing device confirms execution of the LTT process and asks the user for feedback. The user device may present a UI that indicates to the user that the user device desires feedback on the LTT process. Feedback can include suggestions to improve the LTT process, any errors the user encountered when completing the LTT process, ease of completing the LTT process and verification, and so forth. At step, 786, the user device can provide the feedback and event information to the computing device. The computing device can store the feedback and event information in the database.

At step 726, the user device can notify the user to perform the work on the machine. The computing device can send the notification to the user device that the LTT process is complete, and the user is authorized to perform work on the machine. The user device can provide the notification to the user. The computing device can update the database to indicate that a user is performing work on a machine to prevent other users from trying to reenergize the machine while the user is performing work. The computing device can prevent other user from performing an LTT process while the user is performing work. If the computing device gets any indication that the user performing maintenance may be in danger (e.g., an isolation point is reenergized, there is an emergency occurring within the plant, etc.), the computing device can send a notification to the user device to inform the user of the danger so that the user can cease performing work and get to safety. In this manner, the computing device can improve the safety of workers performing work on machines.

At step 728, impacted associates can be notified that work is being performed. The computing device and/or the user device can send one or more notifications to other users to inform the other users that the user is performing work on the machine. The computing device and/or the user device can request notification from the other users confirming that the other users have received the notification. The computing device and/or user device may prevent the user from performing working until notifications indicating that all the other users acknowledged receipt of the notification. At step 788, the computing device can store the data indicating the notification was sent in the database. At step 790, the computing device store all notification evidence for validation that the notifications were received by all the users.

At step 730, the UI guides user to remove isolation devices and scan identifier. That is, after the user has performed work on the machine, the user device will guide the user through the process of reenergizing the machine. The user removes each isolation device and records evidence of completing the step. At step 792, evidence of completing the step is sent to the computing device to store in the database. After completing a step, the user device records evidence of completing the step (e.g., the event) At step 794, event data is sent to the computing device to store in the database.

At step 732, the user device guides the user to the next isolation device until all the isolation devices are not isolated. Stated differently, the user device provides step-by-step instructions to the user so that the user can reenergize the machine. The user device records data for each step as described in steps 792 and 794.

At step 734, the user device provides instruction to restart the equipment. For example, after the user has removed all isolation devices and recorded the evidence of doing so, the user device may provide instructions to the user to restart (e.g., energize) the machine that the user has been performing work on. Notification of restarting the machine may be sent to the computing device. The computing device can store the notification in the database and update data (e.g., the user profile 200 and the LTT process profile 250 of FIG. 2) to indicate that the LTT process has been completed, the user that completed the LTT process, and that the machine has been energized and is ready to perform work.

Figure 8:
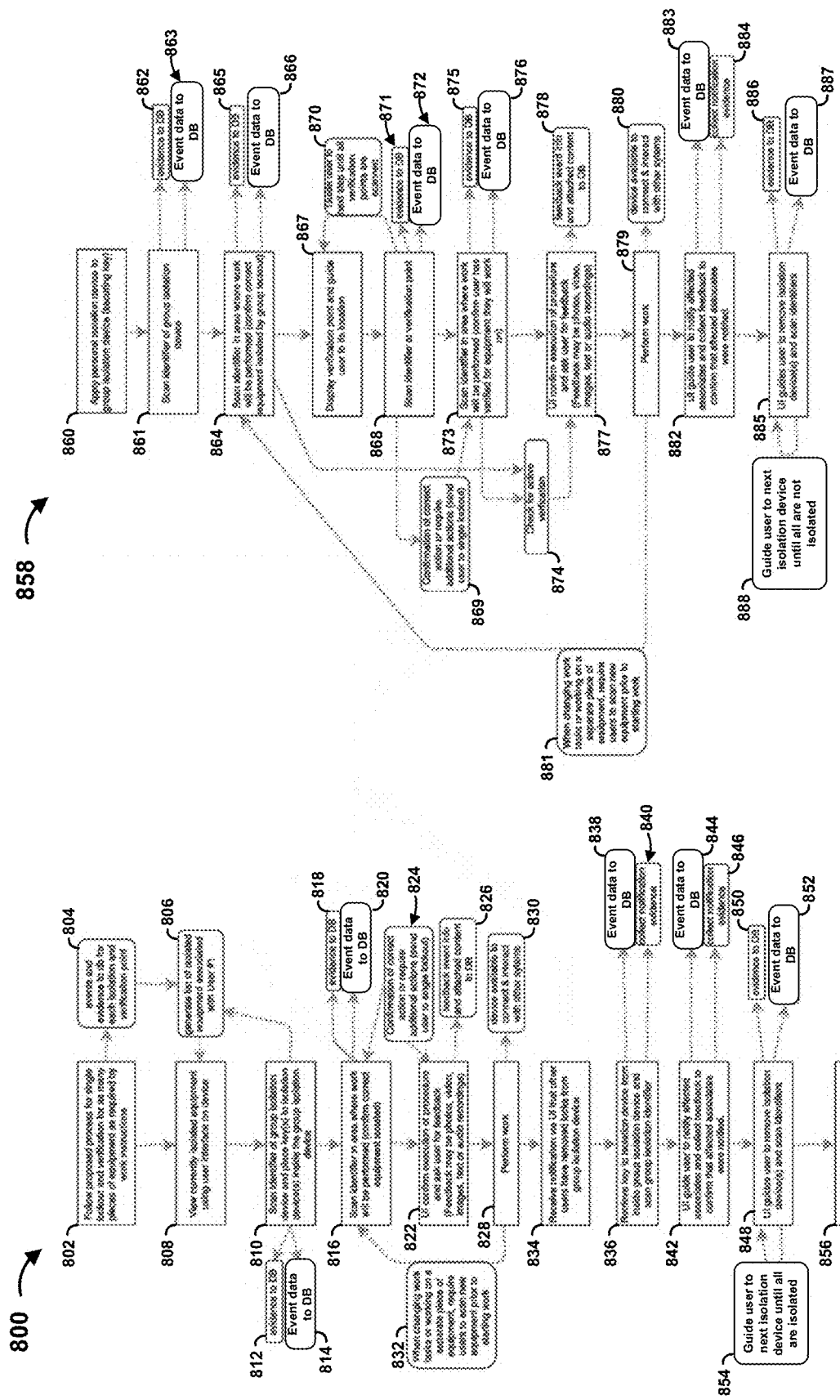
FIG. 8 is a flowchart of an example method.

FIG. 8 illustrates a flowchart for two example methods 800 and 858 for completing an LTT process for two or more users. For example, the method 800 may be completed by a first user and the method 858 may be completed by a second user.

At step 802, a user follows a proposed process for a single lockout for as many pieces of equipment as required. For example, the user may complete an LTT process for 4 of 4 sections of a machine. After the user has successfully isolated the machine, another user may join the group lockout (e.g., the LTT process) by following the method 858 independently of the method 800. The another user who joined the LTT process can be protected by preventing the user from re-energizing the machine until the another user has finished working on this machine. In this manner, additional users can be added to the LTT process after the LTT process has begun.

At step 804, evidence is stored for in a database (e.g., by the user device 102 and/or the computing device 104 of FIG. 1) for each isolation point and verification point. The user may utilize a user device to scan evidence. The user device can send the evidence to a computing device. The computing device can store the information in the database.

At step 806, a list of equipment associated with the first user is generated. The computing device can generate the list of equipment based on data stored in the database. For example, the list of equipment can include all sections of the machine that the user has completed an LTT process for. As another example, the list of equipment can include any machine that the user has completed an LTT process on to isolate a portion of the machine. Accordingly, the list of equipment can indicate the machines and/or sections of machines that are currently isolated by the user.

At step 808, the list of equipment can be presented to the user. For example, the computing device can provide the list of equipment to the user device. The user device can then display the list of equipment to the user for the user to review. For example, the list of equipment can indicate the LTT processes that the user has completed, as well as the LTT processes that the user needs to complete to isolate a device.

At step 810, a group isolation device identifier is scanned. The user device may scan the group isolation device identifier. At step 812, evidence of the identifier being scanned can be sent to the database to be stored. At step 814, even data can be sent to the database to be stored.

At step 816, an identifier where work will be performed is scanned. The user device may scan the identifier. The identifier may cause the user device to present an LTT process. At step 818, evidence of the identifier being scanned can be sent to the database to be stored. At step 820, even data can be sent to the database to be stored. The user may execute the LTT process. The user device can store evidence of each step in the LTT process being completed.

At step 822, confirmation of executing the LTT process can be displayed to the user. Feedback can be requested from the user relating to the LTT process. At step 826, the feedback can be stored in a database. At step 824, the confirmation of executing the LTT process can be verified to ensure all proper steps have been taken to isolate the device. If the proper steps cannot be verified, the computing device may provide one or more additional steps to the user device so that the user can verify that the LTT process is completed.

At step 828, the user performs work on the machine that is associated with the LTT process. Evidence of the user performing work on the machine can be stored in the database. The computing device can send the notification to the user device that the LTT process is complete, and the user is authorized to perform work on the machine. The user device can provide the notification to the user. The computing device can update the database to indicate that a user is performing work on a machine to prevent other users from trying to reenergize the machine while the user is performing work. The computing device can prevent other user from performing an LTT process while the user is performing work. If the computing device gets any indication that the user performing maintenance may be in danger (e.g., an isolation point is reenergized, there is an emergency occurring within the plant, etc.), the computing device can send a notification to the user device to inform the user of the danger so that the user can cease performing work and get to safety. In this manner, the computing device can improve the safety of workers performing work on machines. At step 830, while the user is performing work on the machine, the user device can be available to connect and interact with other systems to indicate that the user is performing work on the machine. For example, the user device can notify one or more other user devices in proximity to the user device that work is being performed on the machine.

At step 832, if the user decides to change what the user is working on, additional steps in an LTT process may be provided to the user prior to starting work on the other devices. For example, if the user is finished performing work on the machine, the user device may provide an LTT process for a second machine for the user to perform work on. As an example, another worker may be performing maintenance on separate section of the machine (e.g., performing the method 858 described in more detail below) so the user cannot restart the machine. Accordingly, the user may utilize the user device to start another LTT process on another machine while waiting for the other user to complete their work.

At step 834, the user device can receive a notification that a user has removed an isolation device from a group isolation device. For example, if the user is performing work on a group isolation machine, the notification can indicate that another user is done performing maintenance. Accordingly, the user can now perform the steps required to restart the machine. As another example, the user may be performing work on the machine still and the notification may be a warning to the user that someone is incorrectly trying to restart the machine. The user can take any action necessary after receiving the warning to ensure the user is performing work safely on the machine.

At step 836, the user can remove isolation device from group isolation machine. For example, the group isolation machine may have a designated location where all personnel performing maintenance on the machine leave an isolation device. The users may remove the isolation device prior to restarting the machine. At step 838, event data is collected and stored in the database. At step 840, notification evidence is collected. For example, the user device may provide a notification to the user that the user has removed a group isolation device. The evidence can be stored in the database.

At step 842, personnel impacted by the group isolation device being removed can be notified. For example, the user device can send a notification to the computing device indicating that the user has removed an isolation device. The computing device can determine any additional user devices associated with the machine that the user is working on. The computing device can send one or more notifications to the additional user devices requesting confirmation that the users of the user devices have received the notification. At step 844, the evidence of the computing device sending the notification can be stored in a database. The computing device can store evidence information in the database. For example, the computing device can store an indication that the notification was sent and to what user devices the notification was sent. At step 846, notification data can be collected. For example, the user device can provide a response to the notification sent by the computing device that the notification was received by the user of the user device. The computing device can store the responses in the database to keep a record of all user devices that have confirmed receipt of the notification. If one or more devices does not send a confirmation of receipt of the notification that was sent, the computing device may send a second notification to the user devices that did not confirm receipt. The computing device can also notify the user device that not all user devices have not confirmed receipt of the notification. The user device can prevent the user from performing any additional steps with restarting the machine until notifications from all devices are received.

At step 848, the UI guides user to remove isolation devices and scan identifier. That is, after the user has performed work on the machine, the user device will guide the user through the process of reenergizing the machine. The user removes each isolation device and records evidence of completing the step. At step 850, evidence of completing the step is sent to the computing device to store in the database. After completing a step, the user device records evidence of completing the step (e.g., the event) At step 852, event data is sent to the computing device to store in the database.

At step 854, the user device guides the user to the next isolation device until all the isolation devices are not isolated. Stated differently, the user device provides step-by-step instructions to the user so that the user can reenergize the machine. The user device records data for each step as described in steps 792 and 794.

At step 856, the user device provides instruction to restart the equipment. For example, after the user has removed all isolation devices and recorded the evidence of doing so, the user device may provide instructions to the user to restart (e.g., energize) the machine that the user has been performing work on. Notification of restarting the machine may be sent to the computing device. The computing device can store the notification in the database and update data (e.g., the user profile 200 and the LTT process profile 250 of FIG. 2) to indicate that the LTT process has been completed, the user that completed the LTT process, and that the machine has been energized and is ready to perform work.

The method 800 and the method 858 can be completed simultaneously. For example, a first user may start isolation of a device in the method 800. The user may complete an LTT process for 4 of 4 sections of a machine. After the user has successfully isolated the machine, another user may join the group lockout (e.g., the LTT process) by following the method 858 independently of the method 800. The another user who joined the LTT process can be protected by preventing the user from re-energizing the machine until the another user has finished working on this machine. In this manner, additional users can be added to the LTT process after the LTT process has begun. The computing device (e.g., the computing device 104) can monitor and store all information related to each person and each LTT process being performed by each person to ensure all users associated with the LTT process, whether the original user or a user who joins the LTT process after the LTT process has begun, are protected. Stated differently, the computing device may prevent any work from being done on any section of the machine until the computing device has verified that each LTT process for each section has been completed properly, as well as reenergizing the machine until all users have completed working on the machine. The computing device can provide notifications to each of the users to update the users of the status of the overall progress of the LTT process.

The method 858 can begin at step 860. At step 860, a user can apply an isolation device to a group isolation device area. For example, the user can apply the isolation device to the group isolation device area where another user has started an LTT process. The computing device (e.g., the computing device 104) can determine, based on the user applying the isolation device to the group isolation device area, that the user desires to join the LTT process. Stated differently, any user working on the machine to isolate the machine can place a respective isolation device in the group isolation device area to indicate each user that is performing an LTT process and/or performing work on the machine.

At step 861, a group isolation device identifier is scanned. The user device may scan the group isolation device identifier. As explained above, the method 858 can be completed at any point after the user completing the method 800 has completed step 810 of method 800, and before the user completing the method of 800 has begun the reenergization process with step 836. Thus, as will be appreciated by one skilled in the art, the step 861 can correlate to step 810 of the method 800. At step 862, evidence of the identifier being scanned can be sent to the database to be stored. At step 863, event data can be sent to the database to be stored. That is, the computing device can determine that the user desires to perform work on the device that another user has started an LTT process on. Thus, the computing device can add the user to the already started LTT process to ensure the user is protected while performing maintenance on the machine.

At step 864, an identifier where work will be performed is scanned. The user device may scan the identifier. The identifier may cause the user device to present an LTT process. At step 865, evidence of the identifier being scanned can be sent to the database to be stored. At step 866, even data can be sent to the database to be stored. The user may execute the LTT process. The user device can store evidence of each step in the LTT process being completed.

At step 867, the verification point may be displayed and the user can be guided to the verification point's location. The user device can provide the user directions to the verification point. The user device can provide the location of the user device to the computing device and the computing device can provide the instructions to the user device based on the location of the user device.

At step 868, an image may be scanned and capture of at the verification point by the user device. At step 871, the captured information may be send to the database. The user device can scan an identifier at the verification point to confirm that the user device is at the verification point. The verification point can be used by the user device and/or the computing device to verify that the user has completed all the appropriate steps in a group of steps of the LTT process. For example, the steps may be to isolated one section of the machine in the LTT process. The verification point can signal to the computing device and/or the user device that the user believes the user has completed all steps for isolating the one section of the machine. The computing device can verify the one section of the machine is properly isolated by utilizing one or more sensors associated with the one section of the machine. As another example, the computing device can verify the one section of the machine is properly isolated based on the information (e.g., the captured images) sent by the user device to the computing device. At step 872, the computing device and/or the user device stores information indicating the user requested verification.

At step 870, the user is guided to the next step until all required steps are completed. Stated differently, steps 867 and 868 of the method 858 are repeated until the steps of the LTT process to isolate the machine are completed. For example, a machine may have 4 different sections that the need to be individually isolated before work can occur on the machine. Thus, once the user completes 1 section of the LTT process to isolate the 1 section, the computing device and/or the user device can provide the user with the steps for isolating the next section of the machine and so on until the machine is fully isolated.

At step 869, the user actions are assessed. The computing device may determine that the user has completed all the necessary steps for completing the section of the LTT process, and provide data to the user device to facilitate the user moving to the next step of the LTT process. The computing device can determine that the user has not completed all the proper steps. That is, the computing device may not verify the steps that the user has completed. In response to determining that the user has not verified all steps, the computing device may send one or more instructions to the user device to guide the user to the unverified steps so that the user can correct the errors associated with the LTT process.

At step 873, the user device scans an identifier in the area where work will be performed. The user device can provide the scanned identifier to the computing device. At step 875, the scanned identifier can be stored in the database (e.g., by the computing device). At step 876, the event data can be stored in the database (e.g., by the computing device).

At step 874, active verification is checked. The computing device can actively determine whether the machine is safe to perform work on. For example, the computing device may determine a user associated with the method 800 has completed an LTT process that is necessary for a user associated with the method 858 to perform maintenance on the machine. Thus, computing device can actively verify that the LTT process is completed by the other user so that the user of the user device can safely perform work on the machine.

At step 877, the computing device confirms execution of the LTT process and asks the user for feedback. The user device may present a UI that indicates to the user that the user device desires feedback on the LTT process. Feedback can include suggestions to improve the LTT process, any errors the user encountered when completing the LTT process, ease of completing the LTT process and verification, and so forth. At step, 878, the user device can provide the feedback and event information to the computing device. The computing device can store the feedback and event information in the database.

At step 879, the user device can notify the user to perform the work on the machine. The computing device can send the notification to the user device that the LTT process is complete, and the user is authorized to perform work on the machine. The user device can provide the notification to the user. The computing device can update the database to indicate that a user is performing work on a machine to prevent other users from trying to reenergize the machine while the user is performing work. The computing device can prevent other user from performing an LTT process while the user is performing work. If the computing device gets any indication that the user performing maintenance may be in danger (e.g., an isolation point is reenergized, there is an emergency occurring within the plant, etc.), the computing device can send a notification to the user device to inform the user of the danger so that the user can cease performing work and get to safety. In this manner, the computing device can improve the safety of workers performing work on machines. At step 880, while the user is performing work on the machine, the user device can be available to connect and interact with other systems to indicate that the user is performing work on the machine. For example, the user device can notify one or more other user devices in proximity to the user device that work is being performed on the machine.

At step 881, if the user decides to change what the user is working on, additional steps in an LTT process may be provided to the user prior to starting work on the other devices. For example, if the user is finished performing work on the machine, the user device may provide an LTT process for a second machine for the user to perform work on. As an example, another worker may be performing maintenance on separate section of the machine so the user cannot restart the machine. Accordingly, the user may utilize the user device to start another LTT process on another machine while waiting for the other user to complete their work.

At step 882, impacted associates can be notified that work is being performed. The computing device and/or the user device can send one or more notifications to other users to inform the other users that the user is performing work on the machine. The computing device and/or the user device can request notification from the other users confirming that the other users have received the notification. The computing device and/or user device may prevent the user from performing working until notifications indicating that all the other users acknowledged receipt of the notification. At step 883, the computing device can store the data indicating the notification was sent in the database. At step 884, the computing device store all notification evidence for validation that the notifications were received by all the users.

At step 885, the UI guides user to remove isolation devices and scan identifier. That is, after the user has performed work on the machine, the user device will guide the user through the process of reenergizing the machine. The user removes each isolation device and records evidence of completing the step. At step 886, evidence of completing the step is sent to the computing device to store in the database. After completing a step, the user device records evidence of completing the step (e.g., the event) At step 887, event data is sent to the computing device to store in the database.

At step 888, the user device guides the user to the next isolation device until all the isolation devices are not isolated. Stated differently, the user device provides step-by-step instructions to the user so that the user can reenergize the machine. The user device records data for each step as described in step 885.

Figure 9:
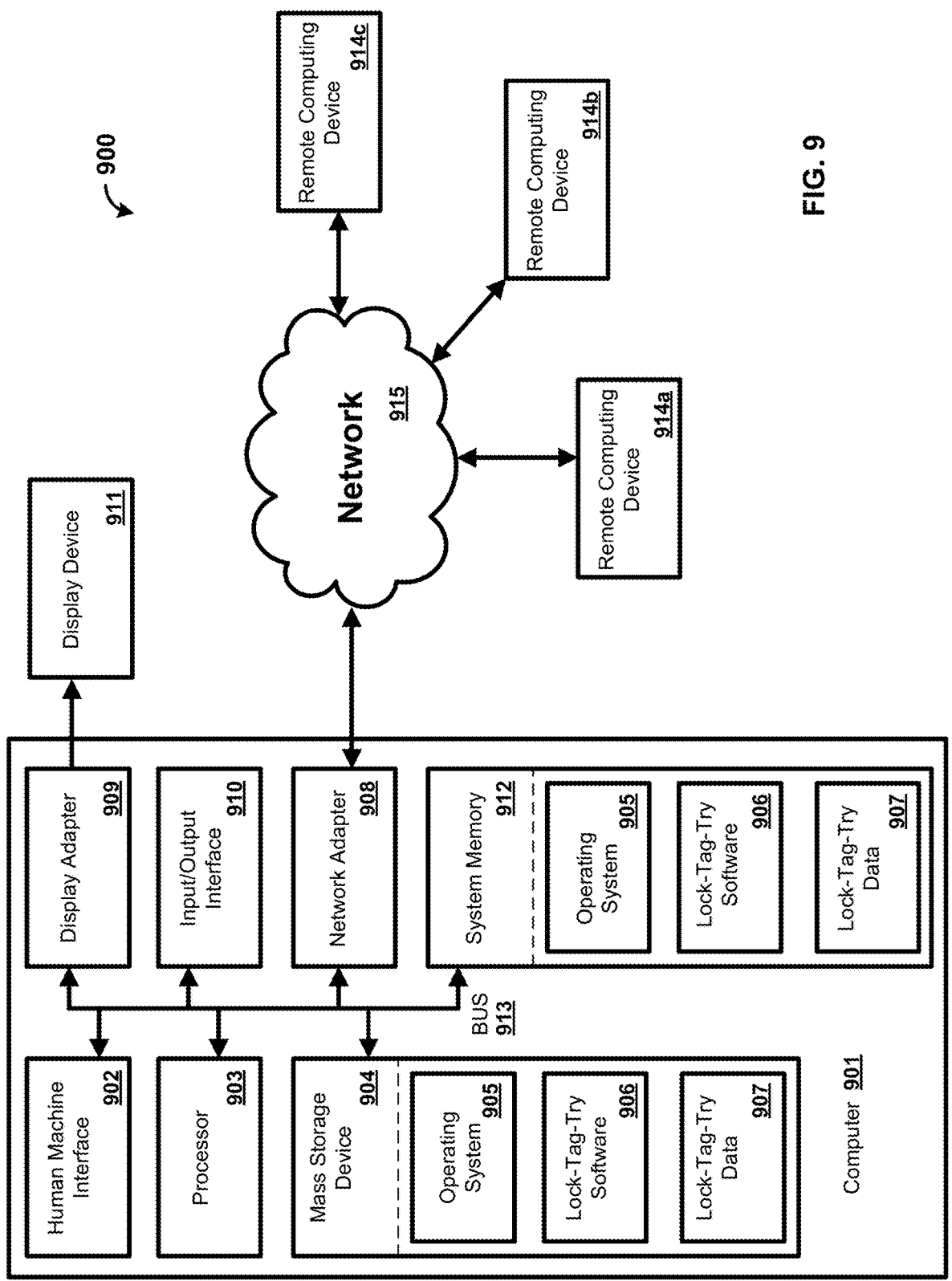
FIG. 9 is a block diagram of an example computing device.

FIG. 9 shows an example of a system 900 comprising a computer 901. By way of example, the user device 102, the computing device 104, the manufacturing device 106, and/or the recording device 108 of FIG. 1 may be a computer as shown in FIG. 9. Similarly, the methods and systems described may utilize one or more computers to perform one or more functions in one or more locations. FIG. 9 is a block diagram showing an example of an operating environment for performing the described methods. This example of the operating environment is only an example of an operating environment and is not intended to suggest any limitation as to the scope of use or functionality of operating environment architecture. Neither should the operating environment be interpreted as having any dependency or requirement relating to any one or combination of components shown in the example of the operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, multiprocessor systems, smartphones, and tablets. Additional examples comprise programmable consumer electronics, network PCs, minicomputers, mainframe computers, and distributed computing environments that comprise any of the above systems or devices, and the like.

The processing of the described methods and systems may be performed by software components. The described systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 901. The components of the computer 901 may comprise, but are not limited to, one or more processors 903, a system memory 912, and a system bus 913 that couples various system components including the one or more processors 903 to the system memory 912. The system may utilize parallel computing.

The system bus 913 represents one or more of several possible types of bus structures, including a memory bus or memory controller, a peripheral bus, an accelerated graphics port, or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The system bus 913, and all buses specified in this description may also be implemented over a wired or wireless network connection and each of the subsystems, including the one or more processors 903, a mass storage device 904, an operating system 905, Lock-Tag-Try (LTT) software 906, Lock-Tag-Try (LTT) data 907, a network adapter 908, the system memory 912, an Input/Output Interface 910, a display adapter 909, a display device 911, and a human machine interface 902, may be contained within one or more remote computing devices 914a,b,c at physically separate locations, connected through buses of this form, in effect implementing a fully distributed system.

The computer 901 typically comprises a variety of computer readable media. An example of a readable media may be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as the LTT data 907 and/or program modules such as the operating system 905 and the LTT software 906 that are immediately accessible to and/or are presently operated on by the one or more processors 903.

The computer 901 may also comprise other removable/non-removable, volatile/non-volatile computer storage media. By way of example, FIG. 9 shows the mass storage device 904 which may provide non-volatile storage of computer code, computer readable instructions, data structures, program modules, and other data for the computer 901. For example and not meant to be limiting, the mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 904, including by way of example, the operating system 905 and the LTT software 906. Each of the operating system 905 and the LTT software 906 (or some combination thereof) may comprise elements of the programming and the LTT software 906. The LTT data 907 may also be stored on the mass storage device 904. The LTT data 907 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices may be connected to the one or more processors 903 via the human machine interface 902 that is coupled to the system bus 913, but may be connected by other interface and bus structures, such as a parallel port, game port, an IEEE 1394 Port (also known as a Firewire port), a serial port, or a universal serial bus (USB).

The display device 911 may also be connected to the system bus 913 via an interface, such as the display adapter 909. It is contemplated that the computer 901 may have more than one display adapter 909 and the computer 901 may have more than one display device 911. For example, the display device 911 may be a monitor, an LCD (Liquid Crystal Display), a touchscreen display, or a projector. In addition to the display device 911, other output peripheral devices may comprise components such as speakers (not shown) and a printer (not shown) which may be connected to the computer 901 via the Input/Output Interface 910. Any step and/or result of the methods may be output in any form to an output device. Such output may be any form of visual representation, including, but not limited to, textual, graphical, animation, audio, tactile, and the like. The display device 911 and computer 901 may be part of one device, or separate devices.

The computer 901 may operate in a networked environment using logical connections to one or more remote computing devices 914a,b,c. By way of example, a remote computing device may be a personal computer, portable computer, smartphone, a server, a router, a network computer, a peer device or other common network node, and so on. Logical connections between the computer 901 and a remote computing device 914a,b,c may be made via a network 915, such as a local area network (LAN) and/or a general wide area network (WAN). Such network connections may be through the network adapter 908. The network adapter 908 may be implemented in both wired and wireless environments. Such networking environments are conventional and commonplace in dwellings, offices, enterprise-wide computer networks, intranets, and the Internet.

For ease of explanation, application programs and other executable program components such as the operating system 905 are shown herein as discrete blocks, although it is recognized that such programs and components reside at various times in different storage components of the computing device 901, and are executed by the one or more processors 903 of the computer. An implementation of the LTT software 906 may be stored on or transmitted across some form of computer readable media. Any of the described methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. An example of computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with specific examples, it is not intended that the scope be limited to the particular examples set forth, as the examples herein are intended in all respects to be possible examples rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations may be made without departing from the scope or spirit. Other examples will be apparent to those skilled in the art from consideration of the specification and practice described herein. It is intended that the specification and examples be considered as exemplary only, with a true scope and spirit being indicated by the following claims.

What is claimed is:

1. A system, comprising:
   a plurality of device readable indicators affixed to one or more components;
   a first user device, configured to,
      scan a first device readable indicator of the plurality of device readable indicators,
      in response to scanning the first device readable indicator, transmit data that indicates a request for one or more content items associated with the first device readable indicator,
      receive the one or more content items associated with the first device readable indicator, wherein the one or more content items are configured to guide a user of the first user device through performing a process for locking out or tagging out energy isolating devices, wherein the one or more content items are associated with the one or more components,
      capture, by a recording element, evidence that indicates the user completed a step of the process associated with the one or more components, wherein the evidence comprises image data recorded by the first user device, and
      transmit the evidence; and
   a computing device, configured to,
      receive, from the first user device, the data that indicates the request for the one or more content items associated with the first device readable indicator,
      determine the one or more content items associated with the first device readable indicator,
      transmit, to the first user device, the one or more content items,
      receive, from the first user device, the evidence,
      verify, based on the evidence, and based on data received from one or more sensors associated with the one or more components, that the user properly completed the step of the process,
      store data that indicates the user properly completed the step of the process, and
      transmit a first notification to a second user device that indicates that the user properly completed the step of the process.

2. The system of claim 1, wherein the first user device is further configured to transmit a second notification to the computing device in response to display of the one or more content items.

3. The system of claim 1, wherein the evidence indicates a lock-tag-try event, and wherein the computing device is further configured to, based on the evidence, create a record associated with the lock-tag-try event in one or more of an evidence database, an event database, or a forensic database.

4. The system of claim 1, further comprising one or more cameras configured to:
   receive a second notification from the computing device; and
   in response to receiving the second notification, record a video of an area that includes the one or more components.

5. The system of claim 4, wherein the recording element comprises the one or more cameras, and wherein the evidence comprises at least one of an image or the video.

6. The system of claim 1, wherein the process associated with the one or more components causes the first user device to:
   transmit a second notification to one or more devices associated with one or more affected personnel, wherein the one or more devices associated with the one or more affected personnel comprises the second user device;
   receive a confirmation from at least one of the one or more devices associated with the one or more affected personnel; and
   transmit, to the computing device, a third notification that indicates the confirmation.

7. The system of claim 6, wherein the first user device is further configured to record the user of the first user device providing an in person notification to a first affected personnel of the one or more affected personnel.

8. The system of claim 1, wherein the process associated with the one or more components causes the first user device to:
   display an indication of an isolation point and a location of the isolation point;
   capture an image of an isolation device applied to the isolation point;
   scan a second device readable indicator that is proximate to the location of the isolation point; and
   in response to scanning the second device readable indicator, transmit, to the computing device, a second notification that indicates the isolation point and the image.

9. The system of claim 8, wherein the process associated with the one or more components causes the first user device to:
   display an indication of a verification point and a location of the verification point;
   scan a third device readable indicator that is proximate to the location of the verification point; and
   in response to scanning the third device readable indicator, transmit, to the computing device, a third notification that indicates the verification point.

10. The system of claim 9, wherein the computing device is further configured to:
  generate, based on the second notification, the image, and based on the third notification, a list of isolated components of the one or more components;
  determine a group isolation device associated with the list of isolated components; and
  transmit, to the first user device, the list of isolated components and a location of the group isolation device.

11. The system of claim 10, wherein the first user device is further configured to:
  receive the list of isolated components and the location of the group isolation device;
  display the list of isolated components and the location of the group isolation device;
  scan a fourth device readable indicator that is proximate to the location of the group isolation device; and
  in response to scanning the fourth device readable indicator, transmit, to the computing device, a fourth notification that indicates the group isolation device.

12. The system of claim 1, further comprising a second device readable indicator that is proximate to an area where work is to be performed on at least one component of the one or more components, wherein the first user device is further configured to send a second notification that indicates the user scanned the second device readable indicator.

13. The system of claim 12, wherein the computing device is further configured to:
  receive the second notification, and
  in response to receiving the second notification, transmit, to the first user device, an authorization to perform work on the at least one component of the one or more components.

14. The system of claim 1, wherein the process associated with the one or more components causes the first user device to:
  display an indication of an isolation point and a location of the isolation point;
  capture an image of the isolation point, wherein the image indicates that an isolation device is not applied to the isolation point;
  scan a second indicator that is proximate to the location of the isolation point; and
  in response to scanning the second indicator, transmit, to the computing device, a second notification that indicates the isolation point and the image.

15. The system of claim 1, wherein the first user device is further configured to:
  cause display of a startup procedure based on the user of the first user device completing the process, wherein the startup procedure comprises instructions for the user of the first user device to energize the one or more components.

16. A method, comprising:
  scanning, by a first user device, a first device readable indicator of a plurality of device readable indicators, wherein the plurality of device readable indicators are affixed to one or more components;
  in response to scanning the first device readable indicator, transmitting, by the first user device to a computing device, data that indicates a request for one or more content items associated with the first device readable indicator;
  receiving, from the computing device, the one or more content items associated with the first device readable indicator, wherein the one or more content items are configured to guide a user of the first user device through performing a process for locking out or tagging out energy isolating devices, wherein the one or more content items are associated with the one or more components;
  capturing, by a recording element, evidence that indicates the user completed a step of the process associated with the one or more components, wherein the evidence comprises image data recorded by the first user device; and
  transmitting, to the computing device, the evidence, wherein the computing device is configured to:
  verify, based on the evidence, and based on data received from one or more sensors associated with the one or more components, that the user properly completed the step of the process, and
  transmit a first notification to a second user device that indicates that the user properly completed the step of the process.

17. The method of claim 16, further comprising transmitting, from the first user device to the computing device, a second notification that indicates the user completed the step of the process, wherein the second notification comprises the evidence.

18. A method, comprising:
  storing, by a computing device, one or more content items associated with one or more components, wherein each component comprises one or more of a plurality of device readable indicators affixed to each component;
  receiving, by the computing device from a first user device, data that indicates a request for one or more content items associated with a first device readable indicator of the plurality of device readable indicators, wherein the data that indicates the request is transmitted in response to the first user device scanning the first device readable indicator, and wherein the first user device is configured to cause display of a startup procedure associated with the one or more components;
  determining, by the computing device, one or more content items associated with the first device readable indicator;
  transmitting, by the computing device to the first user device, the determined one or more content items;
  receiving, by the computing device from the first user device, evidence that indicates a user of the first user device completed a first step of a plurality of steps of a process for locking out or tagging out energy isolating devices, wherein the one or more content items are associated with the one or more components, wherein the evidence is captured by a recording element and comprises image data recorded by the first user device;
  verifying, based on the evidence, and based on data received from one or more sensors associated with the one or more components, that the user properly completed the first step of the process;
  storing, by the computing device, data that indicates the user properly completed the first step of the process; and
  transmit a first notification to a second user device that indicates that the user properly completed the step of the first step of the process.

19. The method of claim 18, wherein storing, by the computing device, the data that indicates the user properly completed the first step of the lock-tag-try process further comprises generating a forensic trail of the user performing the process.

20. The method of claim 18, further comprising, in response to verifying, based on the evidence, that the user properly completed the step of the process, transmitting, by the computing device to the first user device, an acknowledgment that the first step in the process is properly completed, wherein the acknowledgment indicates the user should proceed to a second step of the plurality of steps of the process.

* * * * *